United States Patent [19]
Hartnett et al.

[11] Patent Number: 6,167,479

[45] Date of Patent: Dec. 26, 2000

[54] SYSTEM AND METHOD FOR TESTING INTERRUPT PROCESSING LOGIC WITHIN AN INSTRUCTION PROCESSOR

[75] Inventors: Thomas D. Hartnett, Roseville; John S. Kuslak, Blaine; David R. Schroeder, Mounds View, all of Minn.

[73] Assignee: Unisys Corporation, Blue Bell, Pa.

[21] Appl. No.: 09/128,297

[22] Filed: Aug. 3, 1998

[51] Int. Cl.[7] .................................................... G06F 9/48
[52] U.S. Cl. ............................................................ 710/260
[58] Field of Search .................................... 710/260, 261, 710/262, 266; 712/227, 244; 714/741; 703/23, 26, 28, 15, 16

[56] References Cited

U.S. PATENT DOCUMENTS

| | | | |
|---|---|---|---|
| 5,727,217 | 3/1998 | Young ...................................... | 710/260 |
| 5,889,978 | 3/1999 | Jayakumar ............................... | 710/260 |
| 5,949,985 | 9/1999 | Dahl et al. ............................... | 710/262 |
| 5,995,743 | 11/1999 | Kahle et al. ............................. | 710/260 |

*Primary Examiner*—Glenn A. Auve
*Attorney, Agent, or Firm*—Beth L. McMahon; Charles A. Johnson; Mark T. Starr

[57] ABSTRACT

A system and method is provided for selectively injecting interrupts within the instruction stream of a data processing system. The system includes a programmable storage device for storing interrupt injection signals, each of which is associated with a respective machine instruction. When execution of the associated machine instruction is initiated, the stored signal is read from the storage device and is made available to the interrupt logic within the instruction processor. If set to a predetermined logic level, the signal causes an interrupt to be injected within the instruction processor. The system provides the capability to simultaneously inject different types of interrupts, including fault and non-fault interrupts, during the execution of any instruction. The invention further provides a programmable means for injecting errors at predetermined intervals in the instruction stream. Because the current invention allows interrupt injection to be controlled by programmable logic within the instruction processor itself instead by stimulus generated and controlled by a simulation program as in prior art systems, there is no need to develop complex simulation programs to generate and control the external stimulus. Any simulation program can utilize the interrupt injection system to test the interrupt logic. Furthermore, the injected interrupts are handled in a manner which is transparent to the system software, which makes development of test-version interrupt handling code unnecessary. Moreover, the interrupt injection system may be used during normal (non-test) situations to place the instruction processor under microcode control. This can be useful to provide temporary fixes to hardware problems in a manner which is transparent to the operating system.

27 Claims, 11 Drawing Sheets

SYSTEM AND METHOD FOR TESTING INTERRUPT PROCESSING LOGIC WITHIN AN INSTRUCTION PROCESSOR

BACKGROUND OF THE INVENTION

1. Field of the Invention

This invention relates generally to a system and method for testing interrupt control and processing logic in a data processing system; and more specifically, relates to a system and method for selectively injecting interrupts on an instruction-by-instruction basis utilizing dedicated hardware bits included within each machine executable instruction.

2. Description of the Prior Art

Testing of many of today's electronic systems occurs before the actual design is built and hardware is available. Such testing is performed on a model of the design, and is commonly referred to as design simulation. During simulation, a model of the design under test is loaded onto a simulation system such as the Leapfrog Simulation System commercially available from the Cadence Corporation. The model of the design is typically described in a design language such as that known as Very High-Level Design Language (VHDL). Software programs are written which include the same instruction codes that are executed on the actual hardware. These programs are executed on the simulation system to determine if the design which is loaded on the system operates in the manner expected.

Simulating the design in the above-described manner allows problems to be discovered before the design is actually fabricated within silicon devices. This is becoming increasingly more important as the density and cost of silicon devices continues to increase. Fixing even a single design problem after the design has been fabricated within a high-density silicon device is extremely expensive, and can also greatly increase the time needed to bring a product to market.

Writing simulation programs to adequately test the logic is a challenging task. The programmer must understand the various complexities within the hardware, then work backward to devise a set of tests which will exercise these complexities to ensure proper operation of the design. This task is most difficult for those portions of a logic design having a large number of logical states, or for those circuit designs in which state changes are initiated by asynchronously occurring stimulus. In these instances, a large number of test cases must be devised to adequately exercise the entire design.

Within medium-scale and large-scale data processing systems, one of the most difficult areas of logic to simulate has historically been the instruction processor (IP) interrupt-handling, logic for both of the above-mentioned reasons. Interrupt-handling logic is the logic which handles interrupt events. These events temporarily cause an instruction processor to suspend execution of the currently executing instruction stream so that processing can be initiated on a different task. When this new task is completed, the processor may resume execution of the original instruction stream. Interrupts may occur as the result of a fault occurring within the original instruction stream, or may be the result of an entirely unrelated non-fault event such as the indication by a peripheral device of an occurrence that requires handling by the processor. Because of the varied nature and asynchronous occurrence of the interrupt events, a large number of test cases must be devised to entirely exercise the interrupt logic during simulation.

In addition to the afore-mentioned problems, testing is further complicated by the complexity associated with the interrupt handling logic. This is especially true in large-scale systems having pipelined instruction processors. Pipelined instruction processors allow multiple instructions to be in various stages of execution within the so-called "instruction pipeline" of the processor at one time. When an interrupt occurs, some, or all, of these instructions should be allowed to complete as dictated by the interrupt type. This allows the instruction processor to reach a known state before execution on a new instruction stream is initiated. The state of the processor is saved, the address for the new instruction stream is calculated, and execution is initiated on the new instruction stream. The specific logic sequences which are executed to perform these tasks are, in many cases, dependent on the type of interrupt which occurred, and are also based on which instructions and instruction combinations were executing within the instruction processor when the interrupt was received.

In the development of prior art large-scale data processing systems, thorough simulation of the interrupt handling logic requires that simulation programs be developed to simulate both fault and non-fault interrupts occurring during the execution of each instruction and each instruction combination existing within a data processing system. These simulation programs must control the number of, and type of, instructions residing within the instruction pipeline when an interrupt is induced. In addition, some of the simulation programs must initialize large portions of the data processing system to a known predetermined state before it is possible to induce an interrupt. Because of these complexities, simulation of the interrupt handling logic is a time-consuming and error-prone task. Many errors associated with the interrupt handling logic are not discovered during simulation and have to be corrected after actual hardware availability, increasing development costs. Therefore, what is needed is an improved system for exercising the interrupt logic of a complex data processing system in a manner which will allow design testing to be completed more quickly and more thoroughly. This test mechanism should provide a mechanism to exercise the logic design both during design simulation, and after actual hardware availability.

OBJECTS

It is a primary object of the invention to provide an improved system for injecting interrupts in a data processing system;

It is a further object of the invention to provide a system for selectively injecting interrupts on an instruction-by-instruction basis during design simulation;

It is yet another object of the invention to provide a programmable system for injecting interrupts during execution of every Nth instruction in the instruction stream where N is a programmable positive integer;

It is a still further object of the invention to provide a system including a different respective programmable interrupt injection indicator for predetermined ones of the instructions in the machine instruction set, and whereby execution of any of the predetermined ones of the instructions causes generation of an interrupt if the respective programmable interrupt injection indicator is set to a predetermined logic level;

It is yet a further object of the invention to provide a system for selectively injecting fault interrupts into an instruction stream on an instruction-by-instruction basis;

It is another object of the invention to provide a system for injecting a fault interrupt during executing of a selectable machine instruction only if a fault was not injected during the most recent execution of that machine instruction in the instruction stream;

It is yet a another object of the invention to provide a system for selectively injecting non-fault interrupts into an instruction stream on an instruction-by-instruction basis;

It is still another object of the invention to provide a system for selectively injecting interrupts into an instruction stream during normal machine execution to provide a means for providing temporary solutions to logic errors discovered within the system;

It is yet another object of the invention to provide a system for exercising all portions of an interrupt handling logic design without causing instruction execution to be diverted from a first instruction stream to a second instruction stream;

It is a further object of the invention to provide a system which allows the number of instructions resident within the pipeline during injection of an interrupt to be programmably controlled; and It is another object of the invention to provide a system, which allows interrupts of multiple programmable types to be simultaneously injected during the execution of a selectable one of the instructions included within the machine instruction set of the data processing system.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION le;.5qThe forgoing objects and other objects and advantages are provided in the current invention, which is a system for selectively injecting errors within the instruction stream of a data processing system. The system includes a programmable storage device for storing interrupt injection signals. Each of the stored signals is associated with a respective machine instruction. When execution of a machine instruction is initiated, the associated stored signals are read from the storage device and are provided to the interrupt logic within the instruction processor. If any of these provided signals are set to a predetermined logic level, an interrupt is injected within the instruction processor.

In the system of the preferred embodiment, each instruction is associated with two-stored interrupt injection signals, although a different number of stored signals could also be utilized. A first interrupt injection signal controls injection of a fault interrupt to cause the associated instruction to be aborted prior to execution of interrupt-handling sequences. Following completion of the interrupt sequences, the aborted instruction is re-executed. Special logic associated with fault interrupt injection prevents injection of the interrupt on the subsequent execution of the instruction. This allows instruction execution to continue to the next instruction in the instruction stream, thereby preventing entry into an infinite loop. The second interrupt injection signal controls injection of a non-fault interrupt, which causes the associated instruction to complete execution prior to the execution of interrupt handling sequences. These two types of injection signals are selected to exercise the majority of interrupt logic within an instruction processor, however, other interrupt injection signals may be stored depending on design dictates. Any combination of interrupt injection signals may be set for the same instruction at one time, and the interrupt priority logic will control which interrupts are actually handled.

The interrupt injection signals are programmable to allow a variety of test situations to be developed. In the system of the preferred embodiment, the programmable interface is provided via a scan-set interface, which is well known in the art. Other programming interfaces may also be utilized.

The current invention allows interrupt injection to be controlled by logic within the instruction processor itself. That is, interrupts are not injected by externally controlled stimulus, but instead are injected by programmable logic included within the IP. This allows interrupt injection to occur during any instruction sequence contained in any simulation program. Thus, there is no need to develop complex simulation programs to generate and control external stimulus used to test instruction processor interrupt logic in prior art systems. Moreover, by providing a respective interrupt injection signal for every instruction in the instruction set, a interrupt can be generated during execution of every instruction in any instruction stream. This provides a level of test coverage previously unattainable in prior art systems.

The invention further provides a programmable means for injecting errors at predetermined intervals in the instruction stream. As discussed above, in pipelined instruction processors, multiple instructions are being executed within the instruction processor pipeline at one time. When an interrupt occurs, correctly-performed interrupt logic sequences will cause some of the instructions to complete execution, while selectively causing others of the instructions to be aborted. To fully test that this functionality is logically correct, the invention provides a blocking circuit for blocking interrupt injection signals associated with instructions not occurring at a predetermined programmable interval in the instruction stream. That is, only the interrupt injection signals associated with every Nth instruction are passed to the interrupt logic, where N is a positive programmable integer. This provides a mechanism for testing interrupt handling when the pipeline contains a predetermined number of instructions.

In the preferred embodiment of the current invention, additional simplification in the simulation process is provided by preventing instruction processor execution from being diverted from a first instruction stream to a second instruction steam. As discussed above, during normal (non-test) interrupt situations, the occurrence of an interrupt causes the instruction processor to discontinue execution of a first instruction stream after saving the processor state, and to then begin execution of a second instruction stream which is designed to handle the interrupt situation. During hardware and microcode test situations, this diversion of processor execution may be undesirable since a software instruction stream, generally referred to as an interrupt handler, must be developed to handle each interrupt situation. While this code could be minimal, it still involves the compilation and loading of test software. The current invention provides a means of avoiding this code diversion while at the same time exercising all hardware and microcode associated with an instruction processor hardware design. This is accomplished by providing special hardware and microcode which causes the instruction processor to save the processor state, then handle the injected interrupt in the "normal" (non-test) manner until the point in time at which execution is to be re-directed to a second code stream. At this time, the instruction processor re-loads the previous state and resumes execution of the initial code stream. This mechanism tests all logic sequences associated with the interrupt logic without requiring the additional development of interrupt handling software.

The current invention also provides the advantage of being available for use during non-test situations as well as during simulation. Allowing an interrupt injection signal to inject an error during normal execution is useful for a variety of reasons. In pipelined instruction processors, hard-to-detect errors associated with the overlap of instruction execution may be discovered after the design has been fabricated. Often times these errors will not occur if the instruction processor is executing in a "de-piped" mode such that only a single instruction is being executed at once. Since the injection of an interrupt de-pipes the instruction processor, this can serve as a temporary workaround until the problem is corrected through changes in the logic design. Injection of an interrupt can also be useful to force the instruction processor to come under microcode control during execution of a selected instruction. This allows temporary fixes to be implemented in microcode to correct errors associated with virtually all areas of the instruction processor logic. Because the injected interrupts prevent diversion of execution to an interrupt handler, the temporary fixes can be made transparent to the operating system.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

Figure 1:
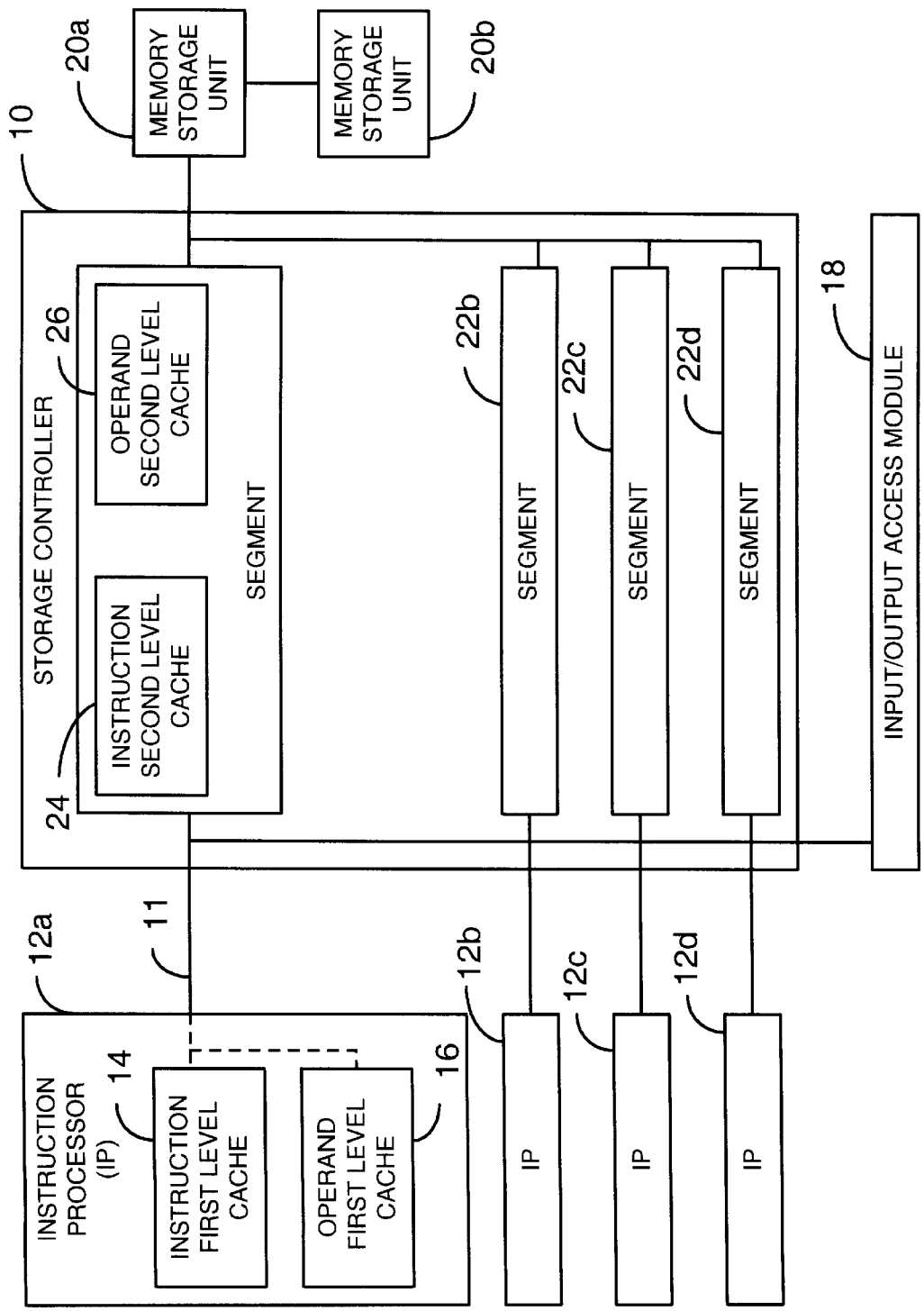
FIG. 1 is a block diagram of the data processing system of the preferred embodiment utilizing the present invention.

A. Background Description of the Pipelined Instruction Processor of the Preferred Embodiment FIG. 1 is a block diagram of the data processing system of the preferred embodiment utilizing the present invention. It will be understood that this system is merely exemplary, and data processing systems having other various architectures are capable of utilizing the present invention. The digital data processing system of the preferred embodiment is modular, and provides for parallel processing of machine instructions. The system utilizes a Storage Controller (SC) 10 with each SC being directly connected via Interface 11 to between one and four local Instruction Processors (IPs) illustratively shown as 12a, 12b, 12c, and 12d. Each IP has a first-level Instruction Cache (I-FLC) 14, and a first-level Operand Cache (O-FLC) 16. The IPs 12a, 12b, 12c, and 12d are the instruction execution units of the system, and provide basic mode and extended mode instruction execution. Each IP fetches instructions from memory, executes the instructions, and stores the results back into memory. The specific operation of the IPs will be described in more detail below.

The SC is further connected to an Input/Output (IO) Access Module, 18, which provides the system interface to input/output channels which support peripheral equipment (not shown.) Finally, the SC is connected to one or two local Main Storage Units (MSUs) illustratively shown as 20a and 20b, which contain the system main memory. The SC 10 has either two or four cache memory segments shown as 22a, 22b, 22c, and 22d. Each cache memory segment has a second-level Instruction Cache (I-SLC) 24 and a second-level Operand Cache (O-SLC) 26.

Figure 2:
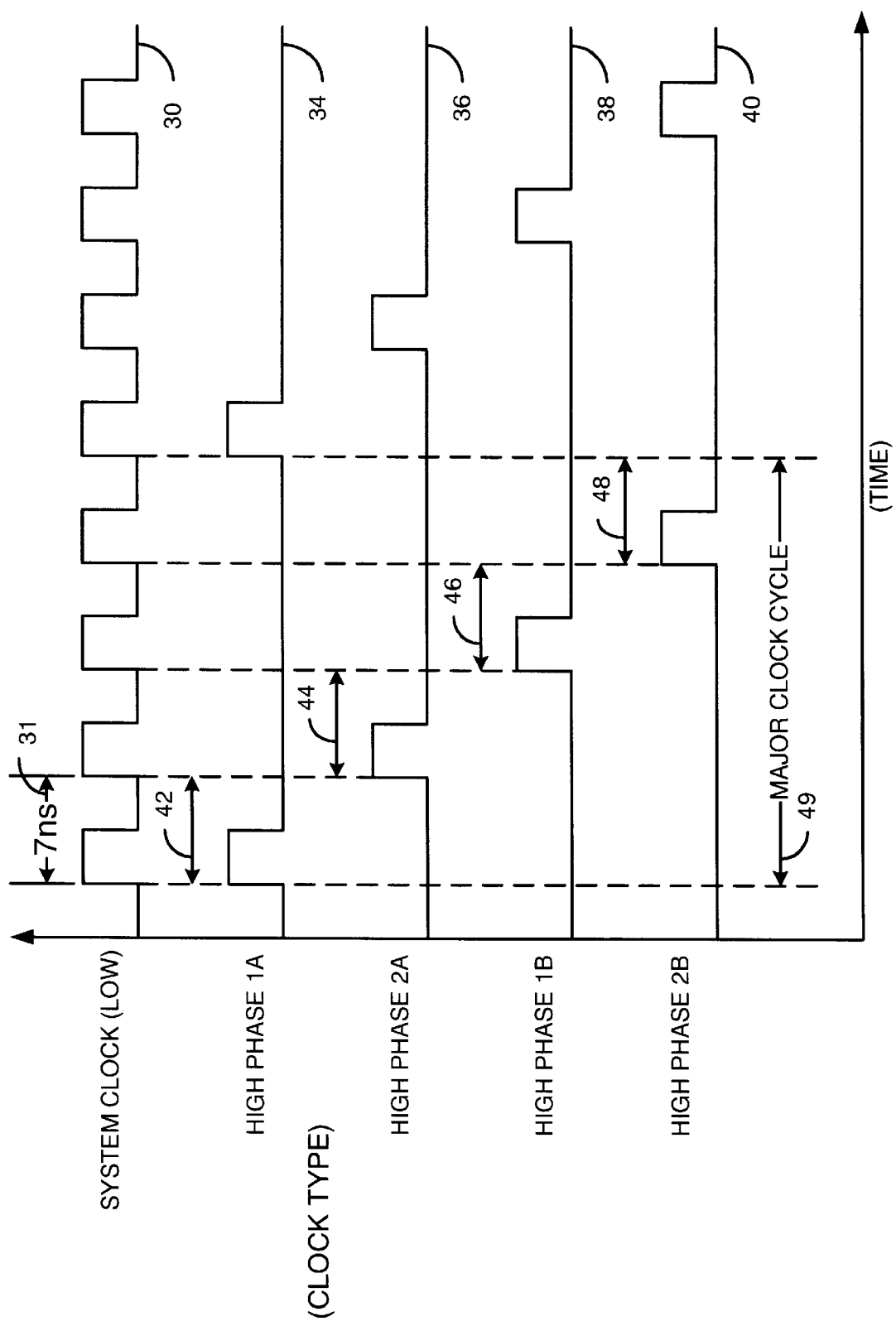
FIG. 2 is a timing diagram illustrating the clock signals associated with the Instruction Processor (IP) logic.

FIG. 2 is a timing diagram illustrating the clock signals associated with the IP logic. The system clock of Waveform 30, which has a period shown by Line 31 of about 7 nanoseconds (ns), is used to generate all other clock signals in the system using a clock-generation scheme which is well-known in the art. Four of the clock signals used within the IP logic are labeled High Phase 1A, 34, High Phase 2A, 36, High Phase 1B, 38, and High Phase 2B, 40. The system clock periods associated with the high clock pulse of High Phase 1A, High Phase 2A, High Phase 1B and High Phase 2B can be referred to as Phase 1A, Phase 2A, Phase 1B, and Phase 2B, shown on Lines 42, 44, 46, and 48, respectively. The time between two rising edges of the High Phase 1A Clock 34 is shown by Line 49, and is referred to as a major clock cycle, which is approximately 28 ns long.

The Instruction Processor of the preferred embodiment uses instruction pipelining to increase system throughput. This means that the execution of each instruction is divided into functional operations, which can be performed within different areas of the IP. Since each functional area of the IP can be processing somewhat independently from the other functional areas, the IP can be executing portions of several instructions at one time so that instruction execution is overlapped.

In the preferred embodiment, the data processing system utilizing the present invention divides a standard instruction into three functional operations. Each operation requires one major clock cycle, also called a "stage", to execute. During the first stage, the machine instruction is decoded and the addresses of any needed operands are generated. In the second stage, any needed operands are fetched from memory. During the third stage, the operation defined by the instruction is performed and the results are stored in memory. When the IP is operating in full pipelined mode, one instruction completes execution every major clock cycle.

Figure 3:
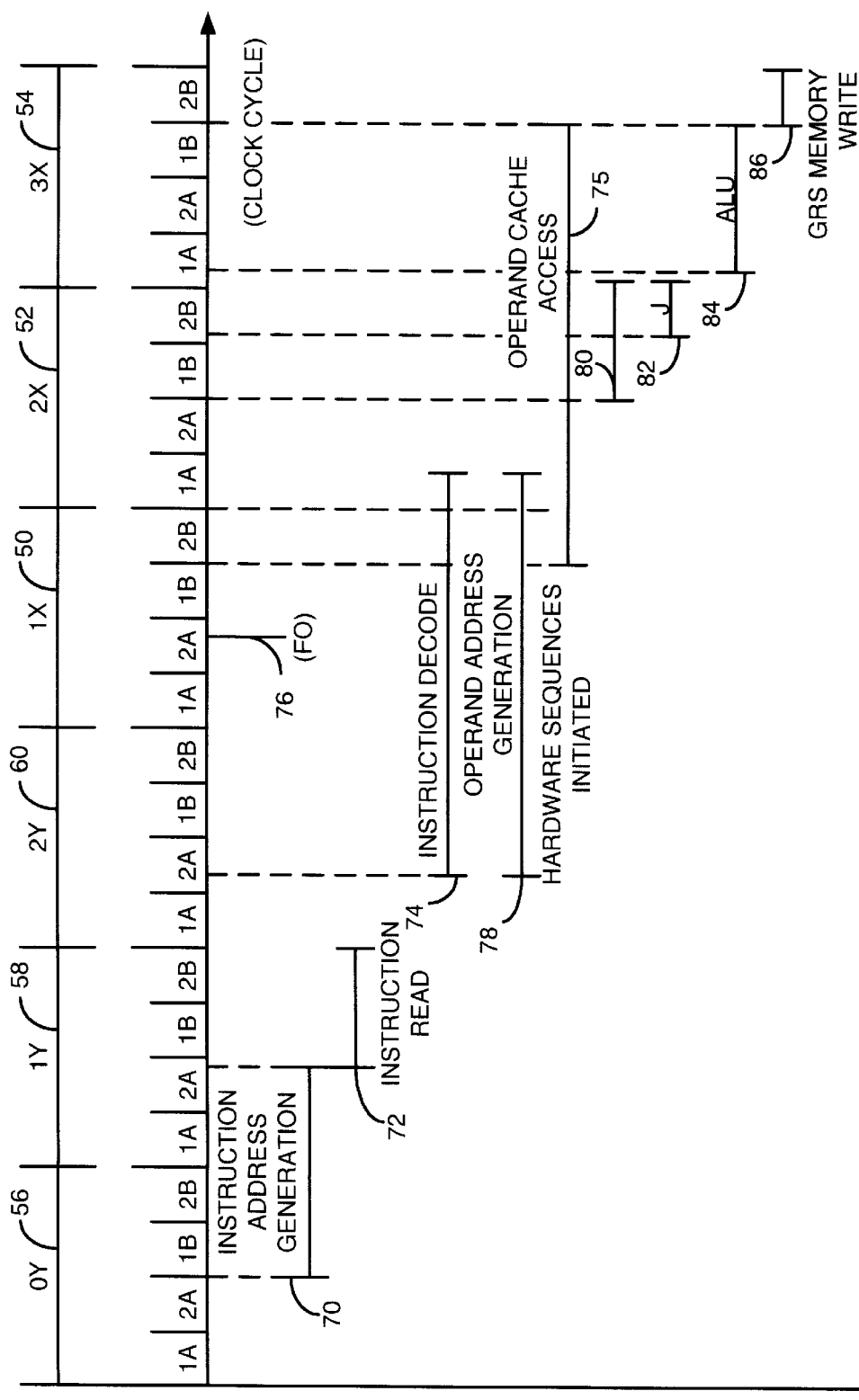
FIG. 3 is a timing sequence diagram illustrating the sequencing of a standard instruction through the instruction pipeline.

FIG. 3 is a timing sequence diagram illustrating the sequencing of a standard instruction through the instruction pipeline. The three execution stages described above are labeled 1X 50, 2X 52, and 3X 54. Prior to instruction execution, three additional major cycles are required to perform instruction address generation, to read the instruction from memory, and to begin instruction decode. These instruction stages are labeled 0Y, 56, 1Y, 58, and 2Y, 60, respectively.

FIG. 3 shows the movement of a standard instruction through the pipeline. During stages 0Y 56 and 1Y 58, instruction address generation occurs, as indicated by Line 70. During phase 2A of stage 1Y 58, the instruction address is presented to the Instruction First-Level Cache 14. Eight instructions are then read from cache during the latter half of stage 1Y, as shown by Line 72. The cache hit lines are valid at the phase 1Y1B, indicating whether a cache hit occurred. If the instruction was not available within the I-FLC 14, the IP suspends operation and initiates an instruction fetch to the I-SLC 24. If the instruction was available within the I-FLC 14, however, the hit lines select one of the eight instructions for execution. The selected instruction is latched at 2Y2A, and decode begins, as shown by line 74. Instruction decode initiates hardware sequences at 1X2B within all logic areas within the IP. These hardware sequences, shown by Line 75, are instruction-specific, and are integral to accomplishing the instruction execution.

The Instruction Register, F0, is loaded during the 1X2A phase at time 76. Operand address generation shown by Line 78 also occurs during the 1X stage 50. During the 2X stage 52, the operand and the General Register Set (GRS) data are fetched, as shown by Line 80. Late in the 2X stage 52, Per J shifting is done to determine whether the entire operand has been fetched as shown by Line 82. In the 3X stage 54, the Arithmetic Logic Unit (ALU) receives the operand and GRS data for processing, as shown by Line 84. Finally, late in the 3X stage 54, results are written to GRS memory, as illustrated by Line 86.

Figure 4:
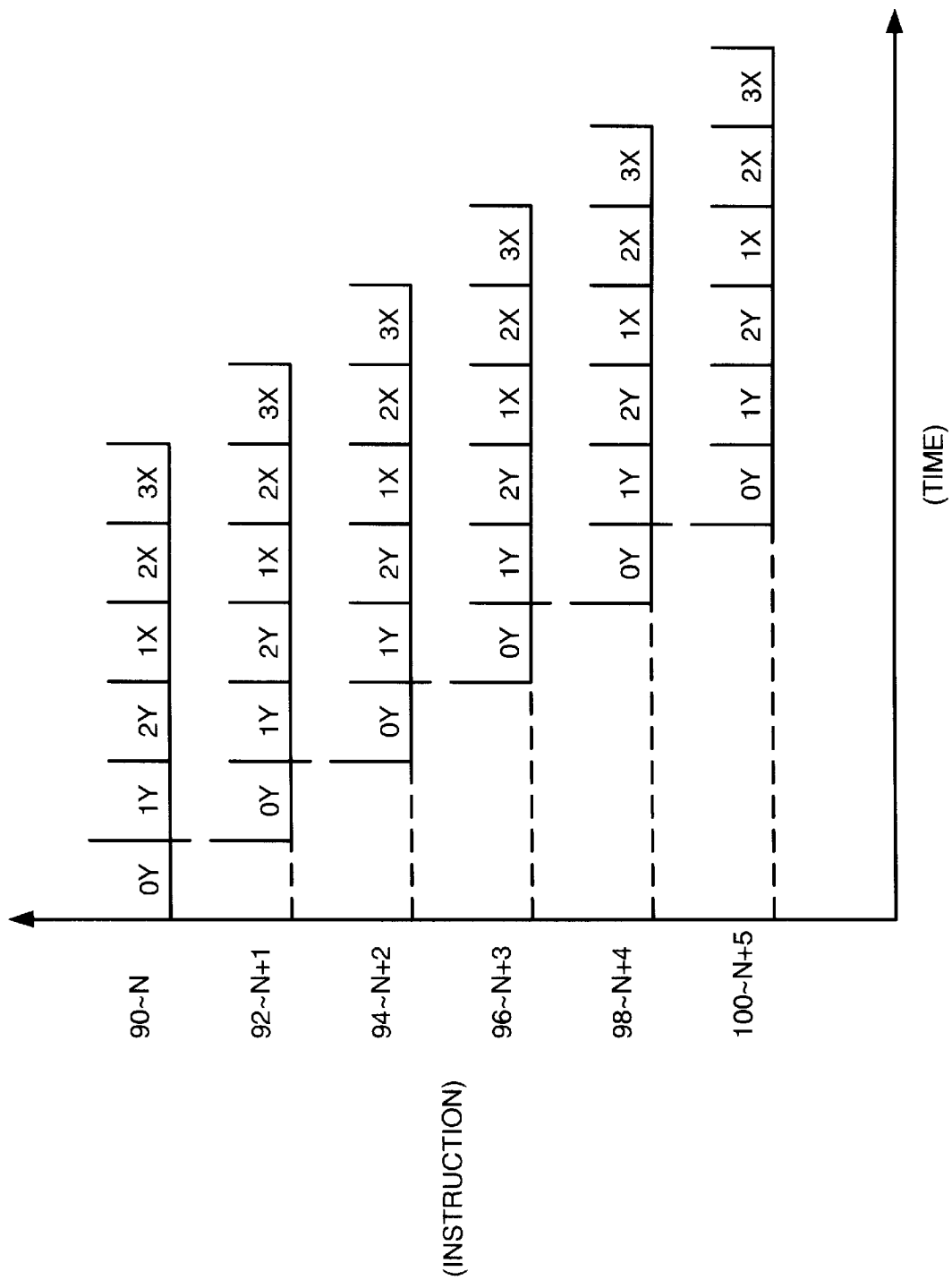
FIG. 4 is a timing diagram illustrating the pipeline instruction overlap of six consecutive standard instructions.

FIG. 4 is a timing diagram illustrating the pipeline instruction overlap of six consecutive standard instructions, N through N+5, labeled 90, 92, 94, 96, 98 and 100 respectively. The diagram represents fully overlapped execution for the three stages of instruction fetch 0Y, 1Y, and 2Y, and the three stages of instruction execution 1X 2X, and 3X. As stated above, during fully overlapped operation, one instruction completes every major cycle, or in the preferred embodiment, approximately 28 ns.

The above-described instruction execution cycles, 1Y, 2X, and 3X, represent the major cycles during which standard instructions can be executed. Other non-standard, or extended-cycle, instructions require more than three execution cycles to complete. For these extended-cycle instructions, instruction pipelining is suspended by delaying the load of the next instruction into the instruction register, F0, so that a variable number of "extended" cycles may be inserted between stages 1X 50 and 2X 52. During these extended cycles, a microcode controller, instead of the hardware instruction decode, assumes primary control over instruction execution. Eventually, the microcode controller relinquishes control, and cycles 2X and 3X are executed so instruction execution is completed. During cycles 2X and 3X, execution of instructions N+1 and N+2 is initiated in the manner described above so the pipelined execution may resume.

Figure 5:
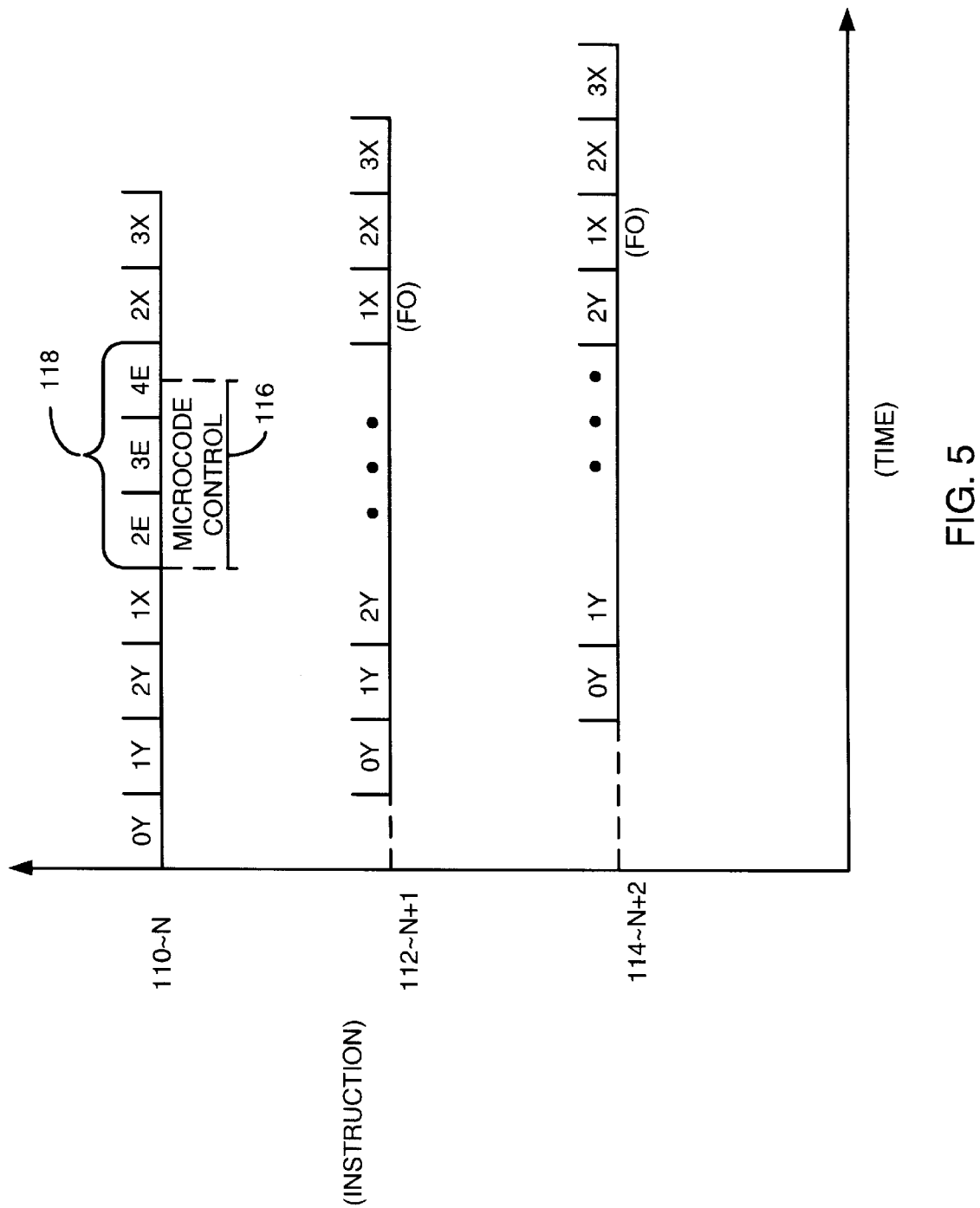
FIG. 5 is a timing diagram illustrating the suspension of the instruction execution pipeline when an extended-cycle instruction is executed.

FIG. 5 is a timing diagram illustrating the suspension of the instruction execution pipeline when an extended-cycle instruction is executed. Three consecutive instructions N 110, N+1 112, and N+2 114 are shown. Instruction N 110 is the extended-cycle instruction. Following cycle 1X, a microcode controller assumes control over instruction execution as is represented by Line 116. This prevents Instruction N+1 112 from being loaded into the Instruction Register F0, and thereby allows execution to continue on the Nth instruction for a variable number of additional cycles 118. These additional cycles are illustratively shown as 2E, 3E, and 4E, but more extended cycles could occur as discussed above.

The microcode controller maintains control until the beginning of the next-to-last (2X) pipeline stage, as shown by line 116. At this time, the next Instruction N+1 112 can be loaded into the Instruction Register F0 and normal pipeline execution is resumed.

During execution of extended-cycle instructions, instruction execution is divided into tasks, controlled by microcode bits from a microcode memory, instead of being controlled by bits generated by the hardware decode. During each of the stages shown as 2E, 3E, and 4E, a new microinstruction is read from a microcode memory within the microcode controller to control a task associated with the extended-cycle instruction as will be described further below. A description of the details of extended mode execution are not necessary for an understanding of the present invention. For more information on extended-cycle execution, see the co-pending application entitled "Programmable Processor Rate Controller", Ser. No. 08/777,214, filed on Dec. 28, 1996, and which is commonly assigned to the assignee of this invention.

Figure 6:
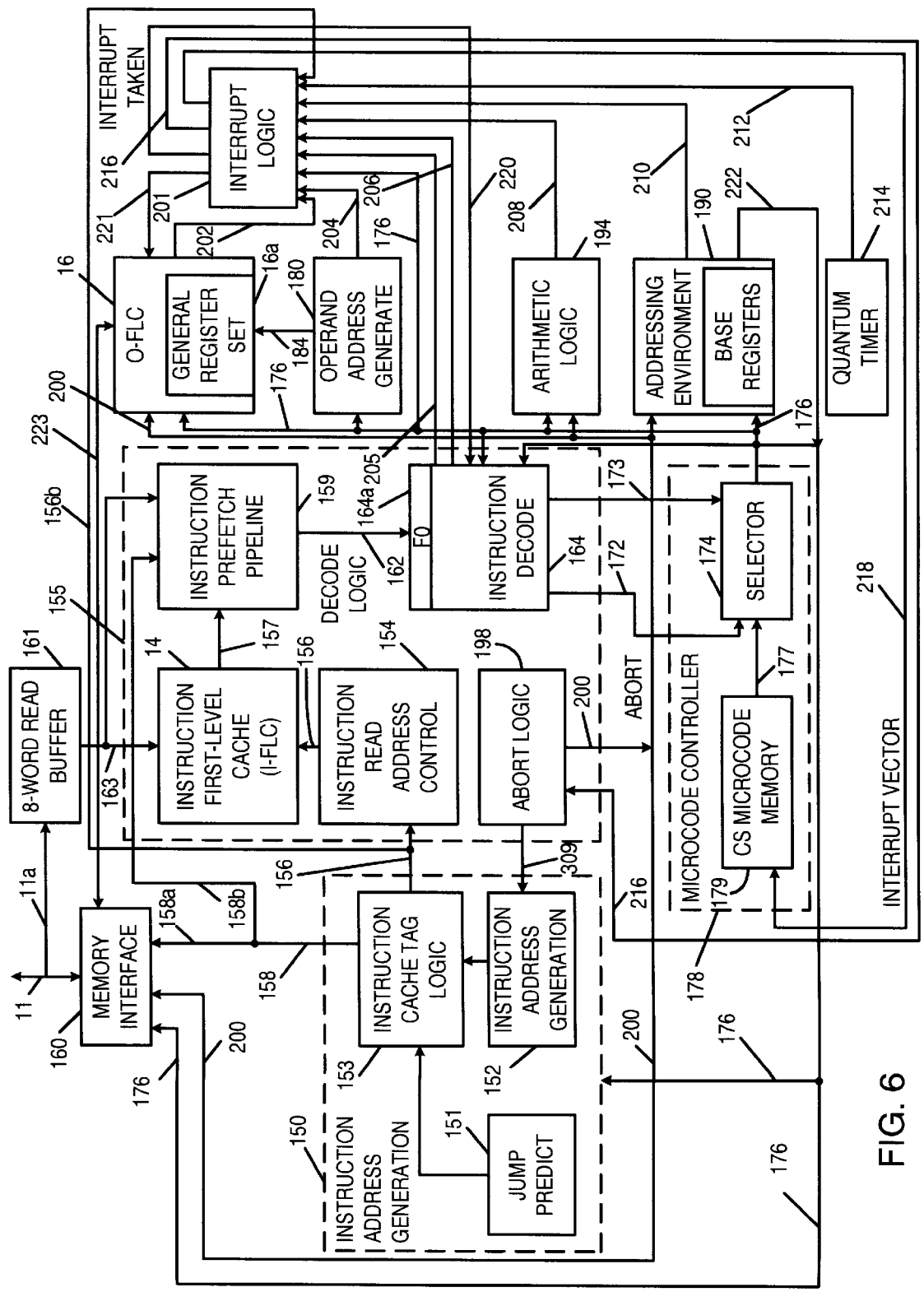
FIG. 6 is a block diagram of the major sections of an IP.

FIG. 6 is a block diagram of the major sections of an IP. Although this diagram does not provide a complete view of all data, address, and control paths, a subset of these paths is shown to facilitate an understanding of how the various IP sections interact, and to provide background information necessary to the understanding of the current invention.

An IP consists of multiple sections. An Instruction Address Generate Section 150 includes logic, which generates an absolute instruction address by adding a relative address to the address of a designated base register. A Jump Predict Subsection 151 and an Instruction Address Generation Subsection 152 provide absolute addresses to the Instruction Cache Tag Logic 153. The Instruction Cache Tag Logic 153 transfers the address to the Instruction Read Address Control Logic 154, which resides in the Decode Logic Section 155, via Interface 156. The Instruction Read Address Control Logic 154 provides the address to the Instruction First-Level Cache (I-FLC) 14 on Address Path 156. The address is used to retrieve eight instructions from each of the eight memory blocks (not shown) of the I-FLC 14. These eight instructions are transferred to the Instruction Pre-fetch Pipeline 159 over Lines 157 where they begin encode.

During stage 1Y, the Instruction Cache Tag Logic 153 indicates via interface lines 158b whether a cache hit occurred. If a cache miss occurred, the current instruction address is not resident within the I-FLC 14, and the instruction must be retrieved from either one of the Instruction Second-Level Caches (I-SLCs) 24 within one of the Segments 22, or from one of the Memory Storage Units (MSUs) 20. As a result, the IP suspends execution. Lines 158a communicate the cache miss to the IP Memory Interface 160, which initiates a memory request to the SC 10 via Interface 11.

The SC 10 provides the interface to the second-level cache segments, which contain the I-SLC 24. The SC further provides an interface to the appropriate Memory Storage Unit (MSU) 20a. or 20b, which will be accessed if the instruction is not resident in the I-SLC 24. When the instruction is returned from either the I-SLC 24 or a MSU 20a or 20b, it is included in an eight-word block of instructions and provided on Data Path 11a to an eight-word Read Buffer 161. Read Buffer 161 latches the eight-word block at phase 1Y1B, then forwards the block over Lines 163 to the I-FLC 14 where it is cached. The eight-word block is also forwarded to the Instruction Pre-fetch Pipeline 159 so that instruction decode can begin.

After the block of eight instructions is resident within the instruction pre-fetch pipeline 159, interface lines 158b select one of the eight instructions as the current instruction. The selected instruction is latched within the Instruction Prefetch Pipeline 159 during phase 2A of stage 2Y, so that decode can begin within the Instruction Decode Section 164 during the second half of stage 2Y. The selected instruction is loaded over lines 162 into the Instruction Register (F0) 164a and latched during phase 2A of stage 1X. Decode continues during the 1X stage.

The Instruction Decode Section 164 generates Hardware Control Signals 172 which are provided to a Selector 174. During standard instruction execution, the Hardware Control Signals 172 are selected by the Selection Control Signal 173 and the Selector 174, and are driven onto Control Lines 176 to all other sections of IP 12 to control execution of the machine instruction. In a like manner, during the extended cycles of extended-cycle instructions, Selection Control Signal 173 allows selection of Microcode Signals 177 from the Microcode Controller 178. The Microcode Control Signals 177 are driven by CS Microcode Memory 179 onto Control Lines 176 to all other sections of IP 12 to control instruction execution.

As stated above, the Control Lines 176 are provided to all sections of the logic, including the Instruction Address Generation 150, Operand Address Generate 180, the Operand First-Level Cache (O-FLC) 16, Addressing Environment 190, and the Arithmetic Logic 194 at the end of stage 1X. to initiate hardware and microcode-controlled sequences. These sequences accomplish instruction execution during the 2X and 3X stages for all instructions, and further during the extended cycles for extended-cycle instructions.

Sometimes, events suspend normal instruction execution. Such events include interrupts, SKIP instructions, or parity errors. When these conditions occur, the Abort Logic Section 198 generates Abort Signals on Line 200 which are provided to all other sections of the logic. The Abort Signals 200 block the initiation of certain hardware sequences, and further "back-out" others of the hardware sequences so that the machine is returned to a state that existed prior to the initiation of a predetermined one of the instructions. This will be described further in the following discussion of interrupt operations.

B. Processing Interrupts Within the Instruction Processor of the Preferred Embodiment As mentioned above, interrupts are a type of event which temporarily suspends instruction execution by causing a re-direction in the flow of instruction execution. That is, upon the occurrence of an interrupt, the processor is forced to discontinue execution of the current instruction stream and to thereafter begin execution of another instruction stream which handles the event causing the interrupt. The processor may, or may not, be allowed to resume execution of the original instruction stream after the interrupt situation has been handled. Whether or not original execution is resumed depends on the type of event causing the interrupt, and on whether a full recovery from the event was accomplished during execution of the interrupt handling code.

FIG. 6 provides an overview of the interconnections to the Interrupt Logic 201 within the IP of the preferred embodiment. Interrupt Logic 201 receives interrupt signals from all other logic sections indicating the occurrence of certain ones of the events which are to cause an interrupt. These interrupt signals are generally provided sometime before the end of the 1X cycle to Interrupt Logic. Interrupt signals indicative of interrupt events are provided on Line 202 by the O-FLC 16, on Line 204 by Operand Address Generate 180, on Line 206 by Instruction Decode 164, on Line 208 by Arithmetic Logic 194, on Line 210 by Addressing Environment, and on Line 212 by the Quantum Timer 214. Some of these events are indicative of a fault occurring during instruction execution. For example, an attempt by an instruction to reference a General Register Set location which is off-limits to the current instruction stream causes Operand Address Generate Section 180 to signal a Reference Violation on the interface represented by Line 204. Similarly, if an undefined machine instruction is decoded by Instruction Decode 164, an invalid instruction indication is provided on Line 206. An illegal operation such as divide-by-zero will cause the Arithmetic Logic 194 to assert a signal on the interface represented by Line 208. The generation of an invalid or out-of-limits address causes Address Environment 190 to indicate an addressing exception by asserting a signal on the interface represented by Line 210. These types of events result in the generation of fault interrupts by Interrupt Logic 201, as will be discussed further below. It may be noted that the above-mentioned events are only exemplary of the many occurrences which may result in the generation of a fault interrupt.

Other types of interrupts are initiated by the occurrence of asynchronous events which are unrelated to the current instruction stream. Some of these types of interrupts are non-fault interrupts which are not associated with errors, but instead initiate a predetermined response within the system. For example, the expiration of Quantum Timer 214 as indicated by the assertion of a signal on Line 212 may indicate that within the multi-tasking environment, processing is to be initiated on a different instruction stream. Other types of occurrences also result in the generation of non-fault interrupts within the system.

FIG. 6 also shows Interrupt Logic 201 receiving additional signals on Line 205 from Instruction Decode 164. These signals are Interrupt Injection Signals used by the current invention to inject interrupts for test or work-around purposes in a manner to be discussed further below.

After Interrupt Logic 201 is signaled of the occurrence of either a fault or a non-fault event within the system, Interrupt Logic selects the highest priority event to process, then asserts the Early Abort Signal on Line 216 to Abort Logic 198. Abort Logic 198 provides Abort Signals on Line 200 to all other logic sections to initiate logic sequences which will place the hardware in a predetermined state by "backing-out" the effects of certain ones of the partially-executed instructions. The initiated recovery sequences are instruction-specific, and in some cases, are even specific to the combination of instructions in the IP pipeline at the time the event occurred.

At approximately the same time the Early Abort Signal is provided on Line 216, Interrupt Logic 201 also generates an Interrupt Vector on Line 218 indicative of the interrupt type. This is provided to Microcode Controller 178 so that the Microcode Controller can generate an address within CS Microcode Memory at which execution will be initiated. Also at this time, Interrupt Logic 210 provides the Interrupt Taken Signal on Line 220 to Instruction Decode 164. This prevents any further instructions included within the current instruction stream from entering the IP pipeline, and forces a special interrupt NOP instruction into the F0 Register 164a. Decoding of the interrupt NOP instruction causes assertion of the Selection Control Signal on Line 173, thereby allowing the Microcode Controller to begin driving the Control Signals on Line 176. Microcode Controller begins executing at the address calculated using the Interrupt Vector, which is the address of the applicable interrupt microcode. CS Microcode Memory 179 assumes control of the IP in a manner similar to that discussed above with respect to the microcode control of extended mode instructions.

After the occurrence of an interrupt, Microcode Controller provides control signals on Lines 176 to the Interrupt Logic which causes the Interrupt Logic to generate an Activity State Packet (ASP). This packet contains the state of the machine at a predetermined time during machine execution, and will be used to analyze and recover from the fault, and/or to determine which type of action must be taken in response to the interrupt. For a fault interrupt, the ASP reflects the state of the machine at the time just prior to the entry of Instruction N into Instruction Register 164a, where Instruction N is the instruction which caused the fault interrupt to occur. For a non-fault interrupt, the ASP reflects the state of the machine following completion of the Instruction N. The contents of the ASP include an instruction address provided on Line 156b by Instruction Address Generation 150. The ASP also includes the contents of predetermined registers within the General Register Set 16a of O-FLC 16, and further includes the contents of registers located within Operand Address Generate 180, and within Addressing Environment 190. These register values are provided on the interfaces represented by Lines 202, 204, and 210, respectively. The ASP may also include either the machine Instruction N or the Instruction N+1 which follows Instruction N, depending on whether the interrupt was a fault or a non-fault interrupt, respectively. This instruction is obtained from F0 164a on the interface represented by Line 206. In some instances, this saved instruction code will be used to resume normal execution following interrupt processing. A predetermined value from the Quantum Timer 214 is also saved in the ASP. Finally, predetermined status bits retained within the Interrupt Logic 201 are also added to the ASP. These status bits are indicative of the privilege level and execution mode of IP at the time the interrupt occurred.

The Microcode Controller 178 controls generation of the ASP using a large number of control signals provided on Lines 176 to all other sections of the logic including the Interrupt Logic 201. These signals cause each of the other logic sections to provide the correct information to the Interrupt Logic, and further allow the Interrupt Logic to create the correctly formed packet for the ASP. The information which is included within the ASP is dependent on the type of interrupt which occurred, and is also dependent on the particular instruction which was being executed at the time the interrupt occurred. Generation of the ASP is discussed further below.

After the ASP is generated, Microcode Controller 178 initiates the writing of the ASP from Interrupt Logic 201 to the O-FLC 16 on Lines 221, and from the O-FLC to the Memory Interface 160 via Line 223. This packet is finally written from Memory Interface 160 to memory within the SC 10, or to MSUs 20a or 20b. Microcode Controller 178 also generates the initial address for the interrupt handler which will be executed to handle the event causing the interrupt. This address is generated using the Interrupt Vector on Line 218 and predetermined registers available within the Addressing Environment 190. Once this initial address is generated, a special microcode instruction called a JUMPSTART is executed which provides the address on Lines 222 and 176 from the Addressing Environment to the Memory Interface 160 and to the Instruction Address Generation 150. It also clears the Selection Control Signal 173. The addressed instruction will be retrieved from the Instruction FLC 14, or in some cases, the SLC 24, and will enter the IP pipeline as described above so that decode of the instruction may begin. In this manner, the IP execution is re-directed to a different instruction stream, and interrupt handling is initiated.

Code within the interrupt handler analyzes the data stored within the ASP in memory to determine what caused the interrupt and what actions must be taken as a result of this occurrence. The information within the ASP must be absolutely correct or recovery will not be completed properly. Once recovery actions are accomplished, execution may be re-started with the instruction stream being executed at the time the interrupt occurred. For fault interrupts, execution will resume with the Instruction N that was in the 1X execution Stage when the interrupt occurred. For non-fault interrupts, execution will resume with the Instruction N+1, which is the instruction that follows the instruction that was in the 1X execution Stage when the interrupt occurred. Execution is resumed by executing a USER_RETURN instruction, which is the final instruction included in the interrupt handler. This instruction enters the IP pipeline, and causes the Selection Control Signal 173 to set so that Microcode Controller assumes control of Control Lines 176 in a manner similar to that described above. Predetermined parameters associated with the USER_RETURN instruction allow the Microcode Controller to calculate the address of the ASP in memory. The Microcode Controller provides control signals on Line 176 to the Memory Interface 160 and to the other logic sections in the IP to allow the saved state of the machine to be reloaded from the ASP into the appropriate registers within the IP. The reloaded information includes the instruction address, and may also include the instruction itself, depending on whether or not a special status bit is set within the ASP. The Microcode Controller then executes another JUMPSTART instruction, causing the Selection Control Signal 173 to clear so that Instruction Decode begins driving the IP control signals. If the actual re-start instruction, which is either N or N+1, is reloaded into the IP pipeline, the JUMPSTART instruction causes Instruction Address Generation 150 and the Instruction Prefetch Pipeline 159 to begin fetching the instructions which follow this re-loaded instruction. Otherwise, if the status bit indicates that the instruction was not to be re-loaded from the ASP, the re-loaded address from the ASP is used to fetch the re-start instruction, either N or N+1, from either the FLC 14, the SLC 24, or from the MSU. In this manner, execution of the original instruction stream is resumed. If an instruction was loaded into the IP Pipeline from the ASP, fetching of instructions in initiated with the instructions following this re-loaded instruction. Otherwise, if the status bit within the ASP was cleared, fetching begins with the first instruction to be executed in the resumed instruction stream.

Figure 7:
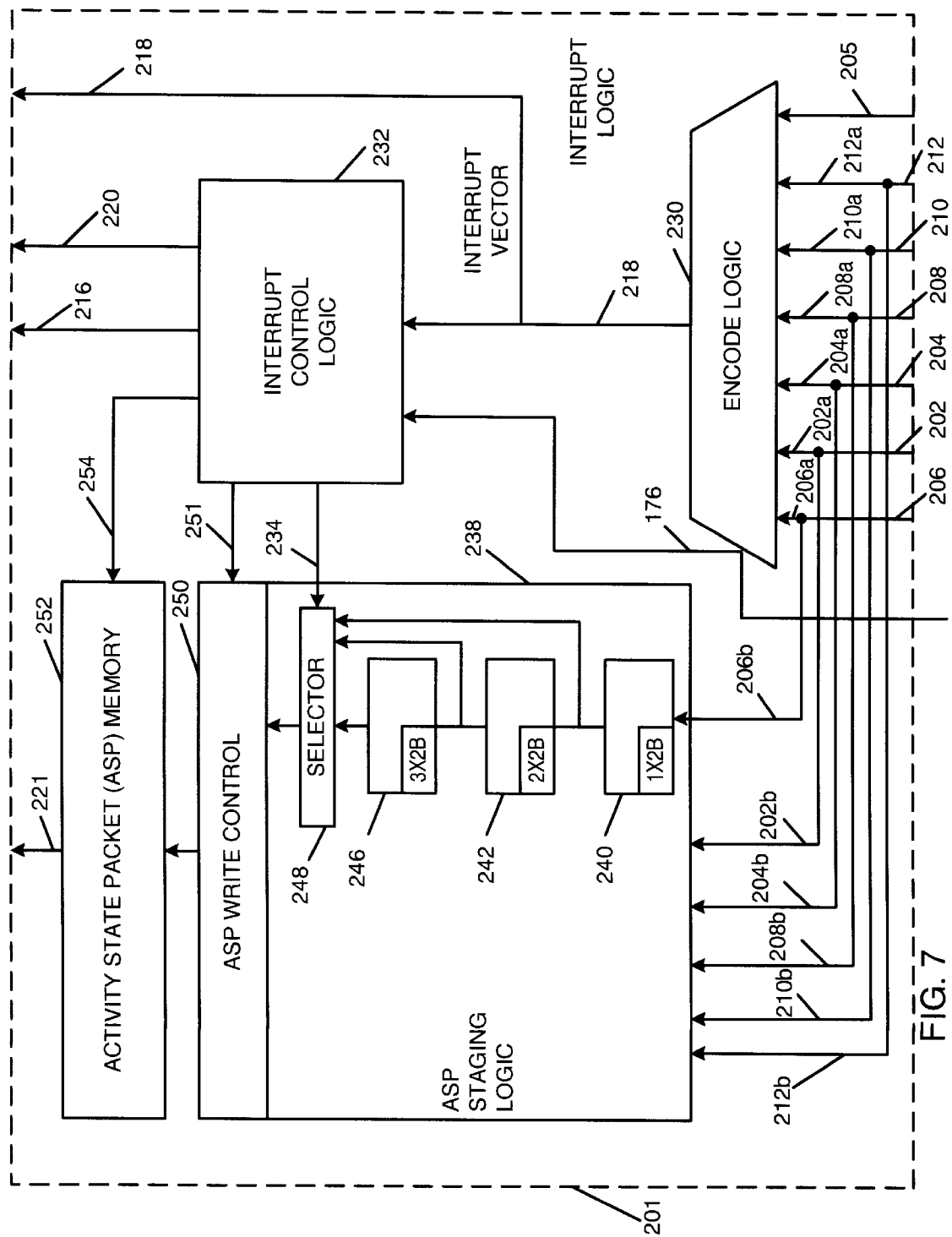
FIG. 7 is a block diagram of the Interrupt Logic.

FIG. 7 is a block diagram of the Interrupt Logic 201. Interrupt Logic 201 receives interrupt signals from all logic sections of the IP, including Operand Cache 16, Operand Address Generate 180, Instruction Decode 164, Arithmetic Logic 194, Addressing Environment 190, and Quantum Timer 214. These signals are provided on interfaces represented by Lines 202, 204, 206, 208, 210, and 212, respectively. Certain signal lines included in the interfaces provide an indication of an event which will cause an interrupt. These signal lines are shown as Lines 202a, 204a, 206a, 208a, 210a, and 212a respectively, and are provided to the Encode Logic 230. More than one event may occur at once. Therefore, Encode Logic latches the event indications, prioritizes the events, and generates the Interrupt Vector on Line 218 which is indicative of the type of interrupt which is occurring. As described above, the Interrupt Vector is provided to Microcode Controller 178 to initiate microcode control of the IP Logic.

The Interrupt Vector is also provided to the Interrupt Control Logic 232. Interrupt Control Logic 232 uses the Interrupt Vector and Control Lines 176 received from Microcode Controller to generate ASP Control Signals on Lines 234. ASP Control Signals are provided to Activity State Packet (ASP) Staging Logic 238 to allow the ASP Staging Logic to capture a snap-shot of the state of the IP. The signals included within the saved machine state are used to resume normal execution following execution of the interrupt handler software as discussed above.

The signals included within the ASP are provided to ASP Staging Logic 238 on Lines 202*b*, 204*b*, 206*b*, 208*b*, 210*b*, and 212*b* from the other logic sections, and are captured using three ranks of staging registers, each of which are clocked by High Phase 2B Clock 48 (shown in FIG. 2). Signals from each of the logic sections are gated into the first rank of staging registers during the 1X stage after the associated instruction is latched in F0 Register 164*a*. For example, the signals received on Lines 206 and 206*b* from the Instruction Decode 164 are shown latched into 1X2B Staging Register 240. These signals are re-latched in the 2X2B Staging Register 242 at the 2B phase of stage 2X, and are again re-latched in the 3X2B Staging Register 246 at the 2B phase of stage 3X. Although the staging is only shown for the signals provided on Line 206*b*, it is understood similar staging logic exists for all signals received by the ASP Staging Logic 238 from the various IP logic sections.

ASP Control Signals are used by Selector 248 to select the signals needed to create the correct snap-shot based on the interrupt type. For a non-fault interrupt, which indicates the occurrence of an event which is not an error, the snap-shot of the IP state is taken after the completion of Instruction N, as is described above. This is acceptable because the Instruction N is not affected by the interrupt, and execution may continue normally following the execution of the interrupt handler. To obtain this snap-shot, signals are selected from the 2X2B Staging Register 242 and other registers (not shown) also included in the second register rank as will be discussed further below in reference to FIG. 9.

In contrast to the non-fault case, the snap-shot for a fault interrupt is taken just after Instruction N is loaded into the F0 Register 164*a*. This is necessary because the fault indicated by the fault interrupt will affect the execution of N, which must be re-executed, if this is determined to be possible. The signals are re-latched in the 2X2B and 3X2B Staging Registers, and are selected from 3X2B Staging Register 240 and other registers (not shown) also included in the third register rank to be provided to the ASP during processing of the fault interrupts.

Finally, according to a third case, some fault and some non-fault interrupts are detected very late during instruction execution. This could occur, for example, if an instruction requires an operation to be performed by the Arithmetic Logic Unit 194 in the 3X stage, and the operation results in an error. In this case, the signals needed to create the correct snap-shot are those signals indicative of the state of the machine at the time Instruction N is loaded into the F0 Register. These signals are selected from the 3X2B Staging Register 244 and other registers (not shown) also included in the third register rank.

Signals selected by Selector 248 are provided to ASP Write Control 250. Interrupt Control Logic 232, under the control of Control Lines 176 from Microcode Controller 178, provides control signals on Line 251 to ASP Write Control 250 to cause various stored signals to be provided to ASP Memory 252 so that the ASP can be generated. Interrupt Control Logic 232 further provides control signals on Lines 254 to the ASP Memory 252 to cause the ASP to be written to the O-FLC 16 on Lines 221.

As described above, Interrupt Control Logic 232 operates under the control of Control Lines 176 to providing control signals to the ASP Staging Logic 238 and the ASP Memory 252. Interrupt Control Logic also utilizes Control Lines 176 to generate control signals on Line 216 which are provided to Abort Logic 200. The control signals include an Early Abort Signal and a Late Abort Signal (not shown individually) which initiate Abort Logic sequences used to terminate the other hardware sequences associated with execution of Instruction N for fault interrupts. Interrupt Control Logic further generates the Interrupt Taken Signal on Line 220, which is provided to Instruction Decode 164 to force the latching of the interrupt NOP instruction into the F0 Register 164*a* in the manner described above.

Figure 8:
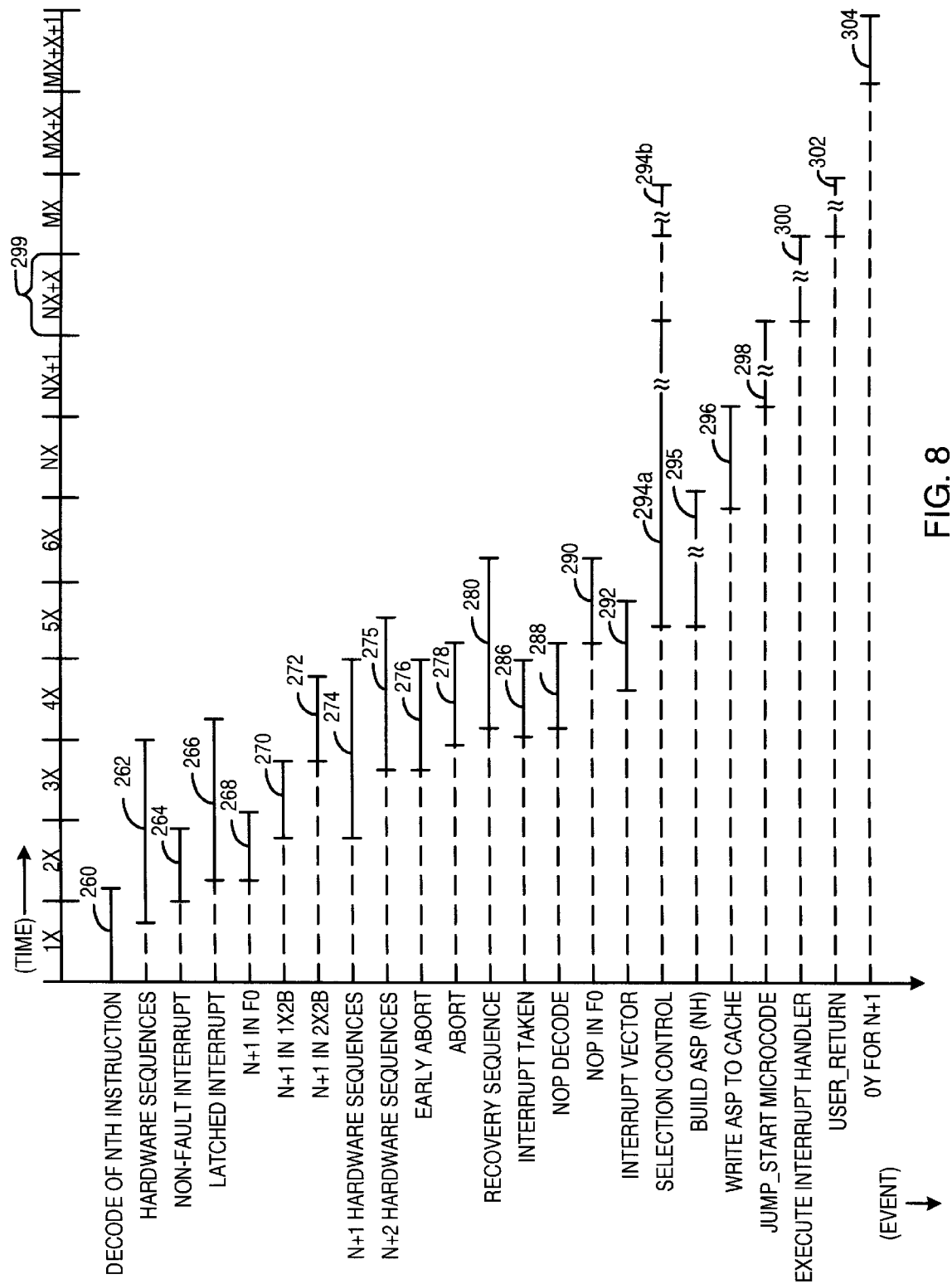
FIG. 8 is a timing diagram of non-fault interrupt processing.

FIG. 8 is a timing diagram of non-fault interrupt processing. Decode of the Nth instruction is shown by Line 260 as occurring within the 1X stage. This decode initiates Hardware Sequences represented by Line 262, which are initiated during the end of the 1X stage and continue until the end of the 3X stage. Sometime during 1X2B, a Non-fault Interrupt occurs as represented by Line 264, and this Non-fault Interrupt indication is latched within the Interrupt Logic 201 as shown by Line 266. Assuming the Instruction N is not an extended-cycle instruction, Instruction N+1 is latched in the F0 Register 164*a* during the 2A phase of the 2X stage, is latched into the 1X2B Staging Register 240 during the 2B phase of the 2X stage for Instruction N, and is further latched into the 2X2B Staging Register 242 during the 2B phase of the 3X stage for Instruction N. This is shown by Lines 268, 270, and 272, respectively. The hardware sequences for Instructions N+1 and N+2 are initiated at 2X2B as illustrated by Line 274. One stage after the hardware sequences for Instruction N+1 are initiated, the hardware sequences for Instruction N+2 are also initiated as shown by Line 275.

Assuming that a non-fault interrupt is selected by Encode Logic 230 as the next interrupt to process, Interrupt Control Logic 232 is signaled of the interrupt occurrence. Because the interrupt is a non-fault interrupt, Interrupt Control Logic does not generate the Early Abort Signal on Line 216 until the 3X2B phase of Instruction N execution as illustrated by Line 276. This allows the execution of Instruction N to complete. It will be noted that if Instruction N is an extended-cycle instruction as indicated by ones of the Control Lines 176, Interrupt Control Logic 232 must delay the generation of the Early Abort Signal a predetermined number of additional stages as determined by the number of extended stages included in extended-cycle Instruction N.

The Early Abort Signal is provided on Line 216 to Abort Logic 198, and Abort Logic asserts several Abort Signals on Line 200, the timing of which is shown on Line 278. The Abort Signals initiate recovery sequences in every section of the logic. These Abort Sequences back out the effects of the hardware sequences for instructions N+1 and N+2. That is, these sequences are performed to return the hardware to the state just prior to the time the hardware sequences for Instruction N+1 began execution. These recovery sequences, which are represented by Line 280, are unique for each instruction and each instruction combination.

At approximately the time recovery sequences are being performed, Interrupt Logic 201 provides the Interrupt Taken Signal on Line 220 to Instruction Decode 164 as illustrated on Line 286. The Interrupt Taken Signal forces an interrupt NOP instruction into the IP pipeline. Decode of the NOP instruction is initiated, and the interrupt NOP is latched into the F0 Register 164a during the 5X stage, as is shown by Lines 288 and 290, respectively.

Interrupt Logic 201 further provides the Interrupt Vector on Line 218 to Microcode Controller 178 as shown on Line 292. This is used to generate the starting address within the CS Microcode Memory 179 of the specific microcode routine used to handle that interrupt type. Microcode Controller begins execution of the microcode when decode of the NOP instruction causes the Selection Control Signal 173 to be asserted as shown on Line 294a. Once Microcode Controller assumes control, Microcode Controller asserts Control Lines 176 to cause the ASP to be built, and to be written from Interrupt Logic to the O-FLC 16 as shown on Lines 295 and 296, respectively.

After the ASP is written to memory, Microcode Controller 178 uses the Interrupt Vector and certain predetermined other data signals to calculate the address of the first instruction included within the Interrupt Handler. Then Microcode Controller begins execution of the JUMP_START microcode, which is the microcode used to change the flow of program execution, as represented by Line 298. The signals provided by the Microcode Controller are driven onto Control Lines 176 to cause generation of the interrupt handler address within Addressing Environment 190. The address is provided to the Memory Interface 160 on Lines 222 and 176 to retrieve the first instruction of the Interrupt Handler. This instruction enters the Instruction Prefetch Pipeline 159 in the manner described above at the clock cycle shown as NX+X 299. Finally, the JUMP_START microcode clears the Selection Control Signal 173, and pipelined execution resumes for this new stream of instructions as shown by Line 300. The interrupt handler, which is coded using machine instructions stored in memory, performs the necessary action to handle the interrupt.

The interrupt handler concludes with a USER_RETURN machine instruction represented by Line 302. This is a microcode controlled instruction similar to the extended-cycle instructions discussed above, and causes the Selection Control Signal 173 to be asserted as shown on Line 294b. This allows Microcode Controller to assume control of the IP Pipeline for a variable number of stages. The microcode for the USER_RETURN routine is stored within CS Microcode Memory 179, and generates Control Lines 176 which cause Memory Interface 160 to retrieve from memory selected data signals stored within the ASP. These signals are loaded into predetermined registers within O-SLC 16, Operand Address Generate 180, Addressing Environment 190, Quantum Timer 214, Decode Logic 155, and Instruction Address Generation 150 to restore the state of the IP to that existing just after the completion of Instruction N. The USER_RETURN routine concludes with execution of the microcode for the JUMP_START, which re-directs the flow of program execution in the manner described above so that the IP resumes execution of the original code stream, starting with Instruction N+1 as shown by Line 304.

It may be noted from FIG. 8 that just prior to the time instruction execution of Instruction N+1 is initiated as shown by Line 304, the IP Pipeline is not executing in fully pipelined mode. That is, the IP Pipeline is "de-piped". This occurs because when the USER_RETURN instruction is executed and Microcode Controller assumes control of the IP pipeline, no additional instructions are read into the F0 Register and the IP pipeline is emptied. The significance of de-piping the IP is discussed further below.

Figure 9:
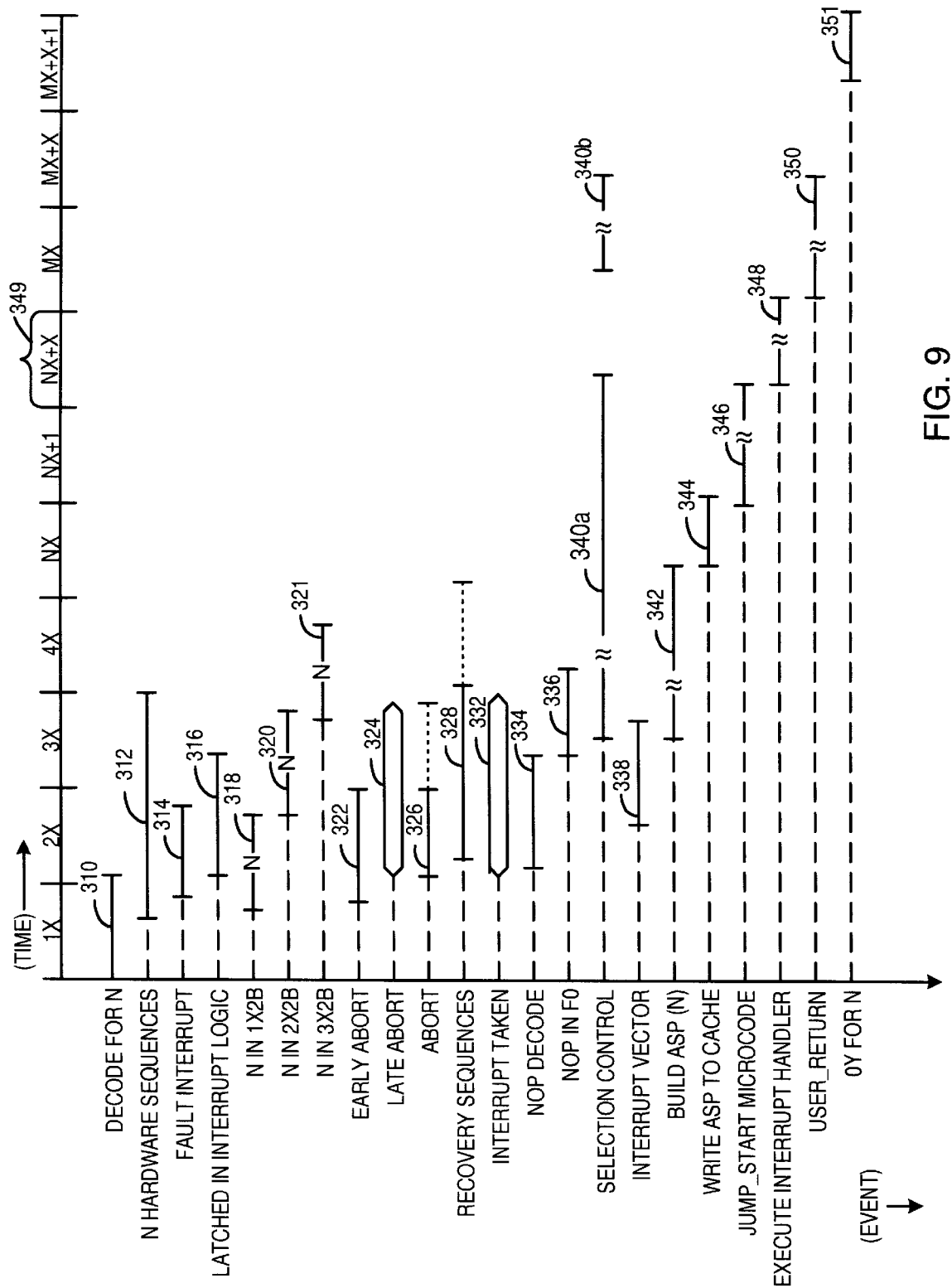
FIG. 9 is a timing diagram of execution of a fault interrupt.

FIG. 9 is a timing diagram of execution of a fault interrupt. This timing diagram shows the general timing associated with a fault interrupt, however each type of fault interrupt has slightly different timing characteristics as is discussed below. Decode of the Nth instruction is shown by Line 310 as occurring within the 1X stage. This decode initiates Hardware Sequences shown on Line 312, which occur during the end of the 1X stage and continue until the end of the 3X stage. Sometime during 1X2B, a Fault Interrupt occurs as represented by Line 314, and this Fault Interrupt indication is latched within the Interrupt Logic 201 as shown by Line 316.

Lines 318, 320, and 321 show Instruction N being latched into the 1X2B Staging Register 240, Staging Register 2X2B 242, and 3X2B 246 Staging Register within Interrupt Logic 201. Sometime during the 1X2B phase, Interrupt Logic generates the Early Abort Signal on Line 216 to Abort Logic 198, the timing of which is shown on Line 322. It will be noted that the Early Abort Signal is generated much earlier than in the non-fault case since the Instruction N is not allowed to complete execution. Sometime within the next major cycle, Interrupt Logic will also provide the Late Abort Signal on Line 216 to Abort Logic as shown by Waveform 324. The timing associated with this signal varies depending on Instruction N. The Early and Late Abort Signals are used by Abort Logic to generate Abort Signals on Line 200, as is shown by Line 326, which in turn initiate Recovery Sequences in each of the logic sections, as shown by Line 328. The specific recovery sequences initiated depend on the instruction combinations present in the pipeline at that time. These sequences return the hardware to a state just prior to the time decode of Instruction N began. All instructions within the pipeline at the time N was loaded into the F0 Register, that is, Instructions N−2 and N−1, are allowed to complete.

While the recovery sequences are being performed, Interrupt Logic 201 provides the Interrupt Taken Signal on Line 220 to Instruction Decode 164 as illustrated by waveform 332. For the fault instruction, the timing associated with the Interrupt Taken Signal is instruction-specific. In some cases, this signal is not generated immediately because the recovery sequences must complete before the Interrupt Taken Signal forces an interrupt NOP instruction into the IP pipeline. Once the Interrupt Taken Signal is asserted, the interrupt NOP instruction is loaded into the pipeline, decode of the NOP instruction is initiated, and the NOP is latched into the F0 Register 164a. This is shown by Lines 334 and 336, respectively.

Interrupt Logic 201 further provides the Interrupt Vector on Line 218 to Microcode Controller 178 as shown on Line 338. This is used to generate the starting address within the CS Microcode Memory 179 of the specific microcode routine used to handle that interrupt type. Microcode Controller begins execution of the microcode when decode of the interrupt NOP instruction cause the Selection Control Signal 173 to be asserted, as shown on Line 340a. Once Microcode Controller assumes control, the ASP is built within the Interrupt Logic 201 during a variable number of stages as shown by Line 342 and as described above. Then the ASP is written to the O-FLC 16, as represented by Line 344, and thereafter is written via Memory Interface 160 to memory.

After the ASP is written to memory, the address of the Interrupt Handler is generated by Microcode Controller 178 using the Interrupt Vector. Then JUMP_START microcode is executed to re-direct instruction execution to the generated address so that the interrupt handler code may be executed, as shown by line 346. The first instruction of the interrupt handler is latched into the Instruction Prefetch Pipeline 159, and execution of the interrupt handler is initiated, as shown by Line 348. The last instruction of the interrupt handler code is the USER_RETURN instruction, execution of which is represented by Line 350. Execution of this instruction causes the Selection Control Signal 173 to be asserted as shown by Line 340b. This allows Microcode Controller 178 to assume control of the IP Pipeline so that signals stored within the ASP may be re-loaded into the IP. The USER_RETURN microcode terminates with JUMP_START microcode, which causes Instruction N from the original instruction stream to be either fetched from memory or re-loaded from the ASP into the IP Pipeline in the manner described above. The timing for the 0Y stage of Instruction N, which enters the Instruction Prefetch Pipeline 159 during the clock cycle shown as MX+X+1, is represented by Line 351.

It may be noted from FIG. 9 that the IP is de-piped for the fault interrupt case in the same manner as described above for the non-fault interrupt case. This will be discussed further below.

The above description provides an indication of the complexity associated with the interrupt handling logic. One of the factors contributing to this complexity includes the fact that so much of the interrupt processing is dependent on the type of interrupt taken, and on the types of instructions present within the IP pipeline at the time that the interrupt is taken. The interrupt type dictates which kinds of recovery sequences are initiated, and will further determine the timing associated with the recovery sequences which are executed. Moreover, the type of the interrupt dictates how the Microcode Controller generates the ASP, and what type of information is included in the ASP. The type of interrupt further dictates the address generated by the Microcode Controller for the interrupt handler, and also dictates how the Microcode Controller re-stores the IP state following execution of the interrupt handler. Furthermore, the type of instruction being executed at the time the interrupt occurs determines the type of information which is provided by the various logic sections to the Interrupt Logic Section for inclusion within the ASP. Literally hundreds of scenarios are possible.

Because the interrupt logic is so complex, and because the correct operation of this logic is critical to the resiliency of the computer system, it is important to test this logic thoroughly. As discussed above, ideally, a large amount of this testing can be completed during simulation testing. Historically, however, it has been shown that the interrupt logic is perhaps the most difficult logical area within an IP to successfully test during simulation for several reasons. Many of the sequences used during recovery following an interrupt occurrence are instruction-specific. For a pipelined IP such as the one discussed above, even the actual combination of instructions within the pipeline at a given point in time can affect the recovery sequences. Additionally, some interrupts occur asynchronously, and could therefore occur during the execution of any instruction. Separate simulation tests should therefor be generated to induce asynchronous interrupts for each case in which the recovery sequences differ. Moreover, since the information included within an Activity State Packet differs for each instruction, adequate testing would encompass verifying the ASP for each non-fault and any possible fault interrupt which could occur for each instruction. Hundreds of test programs are needed to adequately perform testing. Many of these test programs are difficult to develop. For example, inducing some of the interrupts associated with the verification of addressing limits requires initialization of extensive address tables. Devising such test programs is therefore a time-consuming and error-prone task. As a result, historically, a large percentage of the logical errors which go undetected during simulation involved the interrupt logic. Since these errors are not discovered until testing begins on actual hardware, design cycles times are lengthened, and development costs are increased. An improved system and method of testing the interrupt logic is therefore needed to fully and adequately test all interrupt situations prior to the fabrication of the design within silicon. This system and method is the subject of this application.

C. Interrupt Testing Mechanism

Figure 10:
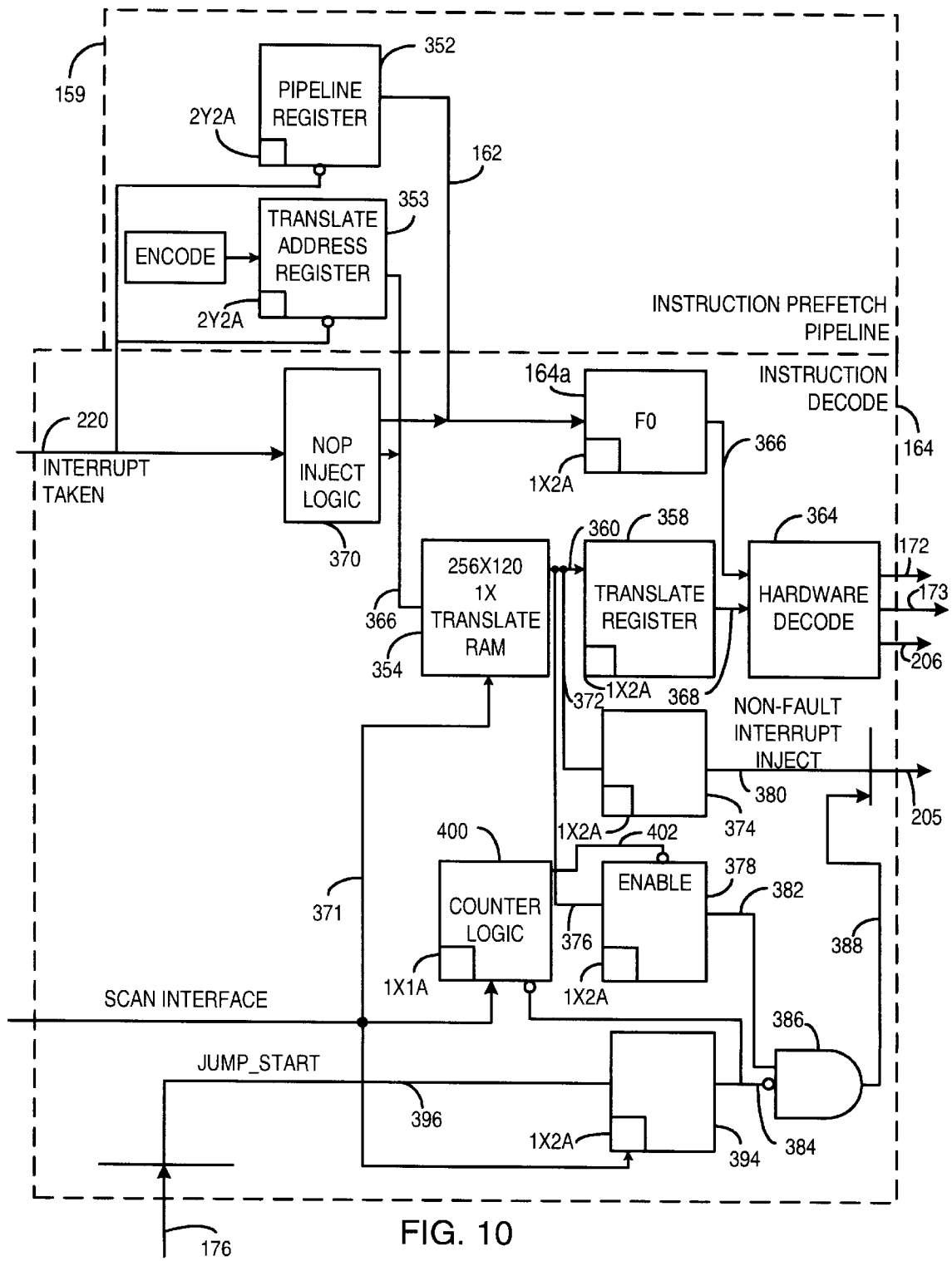
FIG. 10 is a block diagram of the Instruction Prefetch Pipeline and the Instruction Decode Logic.

FIG. 10 is a block diagram of a portion of the Instruction Prefetch Pipeline 159 and the Instruction Decode (ID) Logic 164. Before discussing the details of the interrupt testing system of the current invention, a brief description of the general instruction decode mechanism is provided for background information. An instruction is made available to Instruction Decode 164 after it is selected within the Instruction Prefetch Pipeline 159 during stage 2Y. The selected instruction is latched into the Pipeline Register 352 during phase 2Y2A. Also during phase 2Y2A, an encoded portion of the instruction is latched into the Translate Address Register 353. This data from Translate Address Register 353 is provided as the address to the 1X Translate (ID) RAM 354 on Line 366.

The ID RAM 354 contains a unique set of control bits for each machine instruction. During the end of stage 2Y, the unique control field, which in the preferred embodiment is 120 bits wide, is read from ID RAM 354. Selected ones of these bits are provided to the Translate Register 358 via Line 360, and are latched during phase 1X2A. In addition, the 32-bit instruction from Pipeline Register 352, which is provided to Instruction (F0) Register 164a over Line 162, is also latched during phase 1X2A. The latched information from the F0 Register 164a and the Translate Register 358 is provided to the Hardware Decode 364 via Lines 366 and 368, respectively, during phase 1X2A. In response thereto, Hardware Decode Logic 364 generates the control signals which are provided to the Microcode Controller 178 along with selected ones of the signals from the ID RAM 354 as the Hardware Control Signals on Line 172. The Hardware Control Signals provide control for the IP during the three stages of execution for standard instructions, and also provide control during the 1X stage of execution for extended-cycle instructions in the manner described above.

FIG. 10 further shows NOP Inject Logic 370, which receives the Interrupt Taken Signal 220 from Interrupt Logic 201, and which forces a NOP instruction onto Lines 162 and 366 so that the NOP enters the IP Pipeline following the occurrence of an interrupt.

As mentioned above, ID RAM 354 includes a predetermined number of addressable locations, each of a predetermined width. In the preferred embodiment, the ID RAM includes 256 addressable locations which are each 120 bits wide. Each of the addressable locations is for storing instruction signals associated with a different one of the instructions included in the machine instruction set of the data processing system. Predetermined ones of the instruction signals are driven via Line 172 and Selector 174 onto Control Lines 176 to initiate and control the hardware sequences necessary to execute the respective one of the instructions.

The contents of each of the addressable locations within ID RAM 354 are programmable, and may be loaded using Scan Interface 371, which is a scan-set interface of the type which is well-know in the art. Generally, ID RAM is loaded via Scan Interface 371 at system initialization time. However, selected addressable locations within ID RAM may also be re-loaded at other times during system operation, such as during the operation of a test procedure, as will be discussed below.

The testing system of the preferred embodiment of the invention is implemented by dedicating a predetermined number of bits within each addressable location of the ID RAM 354 to interrupt injection. In the preferred embodiment, each addressable location includes a non-fault interrupt injection bit for injecting non-fault interrupts, and a fault interrupt injection bit for injecting fault interrupts. According to another embodiment, each addressable location could include a bit dedicated to injecting an interrupt of a specific class, such as those associated with addressing faults, and etc. At any given time, one or more of the bits associated with a particular instruction may be set. These bits are used to inject the selected type of interrupt for a selected type of instruction in the following manner.

During the actual or simulated execution of any given instruction, the Instruction Prefetch Pipeline 159 provides an address to ID RAM 354 so that control bits for the instruction are provided on Line 360. If any of the bits associated with interrupt injection are set for that instruction, they are latched into State Devices at the start of phase 1X2A. FIG. 10 shows the non-fault interrupt injection bit being provided on Line 372 to State Device 374, and the fault interrupt injection bit being provided on Line 376 to State Device 378.

The setting of State Device 374 causes Non-Fault Inject Signal on Line 380 to be asserted and driven on Line 205 to Interrupt Logic 201. In an alternative embodiment, this interrupt injection bit could be provided directly from the Translate Ram 354 to the Interrupt Logic. Interrupt Logic includes circuits which latch the non-fault indicator, prioritizes it with any other interrupt occurrences, and eventually provides the Early Abort Signal on Line 216 to Abort Logic 198 according to the same timing discussed above in reference to the non-fault interrupt cases. In response, the Abort Logic generates the appropriate signals on Line 200 to cause the instruction-specific recovery sequences to be executed within all other logic sections for the instruction combination which is present within the IP Pipeline. This occurs in the same manner as would occur for the occurrence of a bona-fide non-fault interrupt.

While recovery sequences are being performed, Encode Logic 230 within Interrupt Logic 201 generates a vector dedicated to the non-fault interrupt inject case, and this interrupt vector is provided to Microcode Controller 178. The Interrupt Vector causes Microcode Controller to begin executing microcode stored within CS Microcode Memory 179 which is dedicated to handling the non-fault interrupt injection case. The microcode for the injection case jumps to portions of the code used during bona fide non-fault interrupt handling to build the ASP packet. As discussed above, this code stores the state of the IP at the time just after the current Instruction N completes execution. This microcode further controls the storing of this ASP to either the O-SLC 26 or one of the MSUs 20 via the Memory Interface 160. However, in the preferred embodiment, instead of executing the JUMP_START microcode to re-direct execution to a new instruction stream as would occur if an actual non-fault interrupt had occurred, the microcode associated with the injected interrupt causes Microcode Controller to begin execution of the microcode associated with the USER_RETURN instruction. As described above, the USER_RETURN microcode causes the Microcode Controller to retrieve the ASP data, and to use that data to restore the state of the IP. The state of the IP is restored to the state that existed just after Instruction N completed. Finally, the USER_RETURN microcode uses the instruction address stored in the ASP to execute a JUMP_START, which loads the N+1 instruction into the Instruction Prefetch Pipeline 159, clears the Selection Control Signal 173, and allows execution to resume with the N+1 instruction in the manner described above.

Those skilled in the art will readily recognize other embodiments for the above-described system. For example, according to another embodiment, a storage device other than the ID RAM may be utilized to store the injection bits. Moreover, one or more of the interrupt injection bits may be associated with predetermined sub-sets of the instructions rather than being dedicated to a respective different instruction.

Alternative embodiments of the microcode are also possible. For example, the microcode could include a JUMP_START to actually re-direct execution to a new instruction stream as would occur during bona fide interrupt processing. A test version of the interrupt handler could be written which would include, at a minimum, the USER_RETURN instruction. This USER_RETURN instruction would be executed in the manner discussed above in reference to actual interrupt processing so that execution of the original instruction stream is resumed following restoration of the processor state. Other similar embodiments are likewise within the scope of the invention.

Figure 11:
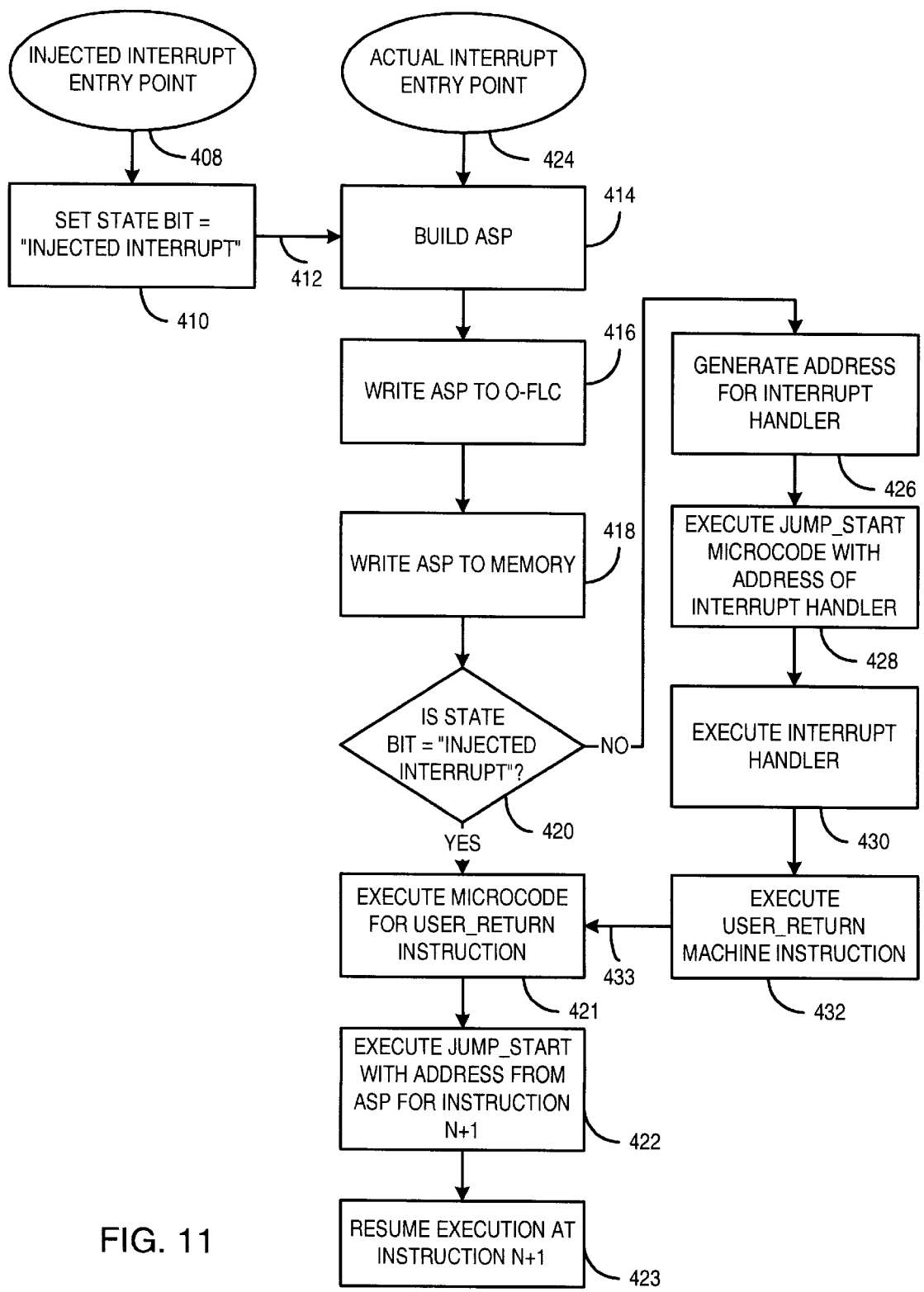
FIG. 11 is a flowchart of the Microcode Controller microcode associated with non-fault interrupts.

FIG. 11 is a flowchart of the Microcode Controller 178 execution associated with non-fault interrupts. If an injected non-fault interrupt occurs, an associated interrupt vector causes Microcode Controller to begin execution at the injected non-fault interrupt Entry Point 408. Microcode Controller sets an interrupt inject state bit indicating that interrupt injection is occurring, as shown by step 410. The handler then jumps to the actual code for building an ASP associated with a non-fault interrupt as indicated by arrow 412. The ASP is generated, written to the O-FLC, and thereafter is written to memory via Memory Interface 160 as indicated by steps 414, 416, and 418, respectively. If the interrupt inject state bit is set, the USER_RETURN microcode is executed as illustrated by steps 420 and 421. This microcode causes signals to be retrieved from the ASP via the Memory Interface 160 and restored to various registers in the IP. Finally, the microcode executes a JUMP_START microcode instruction as is shown in step 422. This causes instruction N+1 to enter the IP Pipeline and instruction execution to resume as shown in step 423.

If an actual non-fault interrupt were occurring, a different vector would be provided to Microcode Controller, causing execution to be initiated at a different entry point 424. The ASP would be generated and written to memory using the code shown in steps 414, 416, and 418. If the inject state bit is not set, the interrupt handler address is generated, and the JUMP_START microcode is executed to re-direct execution to this new instruction address, as is shown by steps 426 and 428, respectively. The interrupt handler is executed including the final USER_RETURN instruction. This is shown by steps 430 and 432, respectively. When the USER_RETURN machine instruction enters the F0 Register, the Selection Control Signal 173 sets because the instruction is an extended-cycle instruction as represented by arrow 433. The Microcode Controller assumes control of the pipeline and the USER_RETURN microcode is executed as shown by step 421. The state of the IP is restored, and the JUMP_START microcode is executed with the address for Instruction N+1, which may be retrieved from the ASP or from memory, as shown in step 422. Finally, execution resumes with the N+1 Instruction as shown in step 423. It will be noted that steps 430 and 432 are not implemented within the Microcode Controller microcode, but are implemented in software stored in memory as discussed above. These steps, along with steps 426 and 428, are not executed during an injected interrupt.

The non-fault interrupt injection microcode tests all aspects of the hardware and IP microcode associated with the handling of an actual non-fault interrupt. The actual recovery sequences are exercised, and the microcode and hardware sequences used to build and to write an actual non-fault ASP to memory are also tested. Additionally, the microcode and hardware sequences associated with the USER_RETURN instruction and which are needed to properly restore the state of the IP and resume instruction execution for the original instruction stream are also tested. However, it will be noted that execution is not actually diverted to an interrupt handler. This is desirable since no code development is required to perform this additional testing. That is, no additional test software is needed to perform the testing during simulation. The desirability of making the interrupt injection process transparent to software executing on the IP is discussed further below.

An example of non-fault interrupt injection is provided to further describe how the testing mechanism operates. Assume that within the addressable location within Translate RAM 354 that is associated with a DIVIDE instruction, the non-fault interrupt injection bit is set. Every time a DIVIDE instruction is executed, the respective addressable location within the Translate RAM 354 is read so that State Device 374 is set at 1X2A for this instruction. Hardware sequences and microcode will be exercised to handle this interrupt in the same manner as would occur if an actual non-fault interrupt such as Quantum Timer Expiration occurred during actual execution of the DIVIDE instruction. Furthermore, by executing the DIVIDE instruction in various instruction streams containing a variety of instruction combinations, the recovery sequences associated with different instruction combinations may be exercised easily.

The above-described test mechanism is primarily intended for use during simulation. A model of the IP logic design including the microcode for CS Microcode Memory 179 and further including the interrupt injection logic, is loaded onto a design simulation system. Machine instructions which are included within a simulation test program are supplied to the simulation system, and the model is exercised to determine if the design reacts as expected. For the non-fault interrupt injection case, execution should continue from Instruction N, to N+1, and so on. Within the simulation model, non-fault interrupt processing will be performed for any instruction for which the non-fault interrupt inject bit is set within the model of the Translate RAM 354.

It may be noted that with the current invention, any simulation program can be used to test the interrupt logic. The testing is initiated by re-loading predetermined ones of the addressable locations within Translate RAM 354 model with new data setting the interrupt injection bits. No special simulation test program needs to be devised to inject interrupts since all injection is performed by the hardware model, and the occurrence of these interrupts is transparent to the simulation program. That is, the occurrence of the interrupts is not visible to the simulation test program because the stream of instruction execution is never changed to execute the interrupt handler.

Using the above-described mechanism, the respective non-fault interrupt bit stored within Translate RAM 354 may be set for every machine instruction included within the instruction set of the IP. If this is done, execution of any simulation test program will cause a non-fault interrupt to occur during the execution of every instruction. As a result, the instruction will be executed, then recovery sequences will be exercised, an ASP will be created, and the IP state will be restored. If a design error exists within the IP simulation model thereby causing the recovery sequences to be performed improperly, the ASP to be generated incorrectly, or the state of the ASP to be improperly restored, execution will almost invariably fail during execution of the subsequent Instruction N+1. This failure can be analyzed using the contents of the ASP, which during simulation is written to a buffer which interfaces to the IP simulator and models the SC and MSU.

Fault interrupt injection occurs in a manner similar to that described above with respect to non-fault interrupt injection. During the actual or simulated execution of any given Instruction N, control bits for the instruction are read from Translate RAM 354 and provided on Line 360. If the fault interrupt injection is set for that instruction, it is latched within State Device 378 so that Line 382 is asserted. Assuming Line 384 is driven to a low-logic level in a manner to be described below, AND circuit 386 drives the Fault Interrupt Inject Signal on Line 388 to Interrupt Logic 201 via Line 205. Interrupt Logic latches the fault indicator, prioritizes it with any other interrupt occurrences, and provides the Early and Late Abort Signals on Line 216 to Abort Logic 198 according to the same timing discussed above in reference to the fault interrupt cases. In response, the Abort Logic generates the appropriate signals on Line 200 to cause the instruction-specific recovery sequences to be executed within all other logic sections for the instruction combination which is present within the IP Pipeline so that the execution of Instruction N is aborted. This occurs in the same manner as would occur for the occurrence of a bona-fide fault interrupt.

While recovery sequences are being performed, Encode Logic 230 within Interrupt Logic 201 generates a vector dedicated to the fault interrupt inject case, and this interrupt vector is provided to Microcode Controller 178. The Interrupt Vector causes Microcode Controller to begin executing microcode stored within CS Microcode Memory 179 which is dedicated to handling the fault interrupt injection case. The microcode for the injection case jumps to portions of the code used during actual fault interrupt handling to build the ASP packet. As discussed above, this microcode stores the state of the IP at the time just prior to the entry of Instruction N within the IP pipeline. This microcode further controls the storing of this ASP to the O-SLC 26 or one of the MSUs 20 via the Memory Interface 160. After the ASP is stored to memory, the microcode associated with the injected fault interrupt causes Microcode Controller to begin execution of the microcode associated with the USER_RETURN instruction in the same manner described above with respect to the injected non-fault interrupt case. As described above, the USER_RETURN microcode causes the Microcode Controller to retrieve the ASP data, and to use that data to restore the state of the IP. The state of the IP is restored to the state that existed just prior to the entry of Instruction N in the pipeline. Finally, the USER_RETURN microcode uses the instruction address stored in the ASP to execute a JUMP_START, which loads Instruction N into the Instruction Prefetch Pipeline 159, clears the Selection Control Signal 173, and allows execution to resume with Instruction N.

Because for the fault interrupt case, execution resumes with Instruction N instead of Instruction N+1, some mechanism is needed to block a second occurrence of the Fault Interrupt Inject Signal on Line 388. Otherwise, instruction execution would not proceed past the instruction having the injected fault interrupt. This is accomplished using State Device 394, which latches one of the Control Lines 176, shown as Line 396, which is asserted by Microcode Controller 178 during the execution of a JUMP_START. Thus, assuming execution of a simulation program begins with State Device 394 cleared, fault interrupt injection will occur for the first execution of an instruction having the fault interrupt bit set, but will be prevented for the subsequent (retry) execution of that instruction so that execution can proceed from Instruction N to Instruction N+1. This allows the test to verify that the interrupt during Instruction N was indeed handled properly. If the recovery sequences were not performed correctly, the ASP was not generated correctly, or if the IP state was not correctly restored, execution will fail during the second attempt to execute the instruction N, and the error can be analyzed using the ASP which is still available in the memory model. This allows logical errors in the interrupt-handling circuitry to be located prior to the fabrication of the design in silicon.

As described above, the occurrence of an interrupt causes the IP Pipeline to de-pipe. This occurs because when the USER_RETURN instruction is executed and Microcode Controller assumes control of the IP pipeline following the occurrence of an interrupt, no additional instructions are read into the F0 Register and the pipeline is emptied. Thus, when the next instruction is executed, that instruction will be the only instruction resident within the IP pipeline. As a result, if a fault interrupt is injected during execution of the next instruction within the instruction stream, the hardware recovery sequences associated with that interrupt will not be fully tested. This is because a large part of the functionality associated with the recovery sequences involves allowing execution to be halted for Instruction N while allowing execution for the two preceding instructions N−2 and N−1 to be completed. It is therefore desirable to provide some mechanism to prevent constant de-piping of the IP during fault interrupt injection.

One way to prevent constant de-piping of the machine is to only inject fault interrupts for predetermined ones of the instructions occurring at predetermined intervals in the instruction stream. For example, for a known simulation program, the order of the instructions can be determined. The user may then re-load the model of Translate RAM 354 such that fault interrupts are only injected for every third instruction within the simulation program so that the IP pipeline is always full at the time any given fault interrupt is injected. This assumes, of course, that the same instruction is either not utilized more than once, or occurs only at predetermined intervals, within the simulation program. It also requires re-loading of the Translate RAM 354 between test cases using Scan Interface 371.

Another way to prevent IP de-piping is by utilizing counter-timer logic similar to that shown in FIG. 10 as Counter Logic 400. Counter Logic includes a counter/timer (not shown) which may be scanned to a predetermined initial value using Scan Interface 371. Counter Logic 400 provides a high-active signal on Line 402 as long as the counter/timer stores a non-zero value. The signal on Line 402 prevents State Device 378 from setting so that a Fault Interrupt is not injected even if the Fault Interrupt Inject bit is set. Counter Logic is decremented during the 1X1B phase of instruction execution, and will eventually decrement to zero so State Device 378 is set and an interrupt is generated. The Counter Logic 400 is then re-loaded with the initial value, and the process is repeated. Since Counter Logic 400 is only decremented during the initial execution of any instruction as determined by the signal on Line 384, the initial count value will determine the frequency with which fault interrupts are injected. For example, if the initial count value is set to three, interrupts will be injected every third instruction, and the IP pipeline will always be full when a fault interrupt is injected.

The above-described logic is added to the logic design for an IP primarily for use during simulation so that complex interrupt logic may be tested prior to design build. By programming Translate RAM 354 selectively to include Fault Interrupt and/or Non-Fault Interrupt Inject bits for predetermined ones of the instructions, selected interrupts will be generated during the execution of any simulation program. This dramatically reduces the time required to develop simulation tests while vastly increasing the number of interrupt test cases that are executed. Moreover, interrupt testing may be conducted in conjunction with the testing of other logical functions. As a result, the number of post-fabrication errors involving interrupt logic is dramatically reduced at the same time design cycles are shortened.

It may be noted that although the interrupt test system described in this application is utilized primarily during simulation, the system may also be used in the manner described above during actual IP execution after hardware build is performed.

D. Use of Interrupt Injection Logic During Non-Test Situations

The interrupt test logic of the present invention is useful during normal (non-test) machine operation as a method of executing code "workarounds" when errors are found after an IP design is built. For example, in a pipelined instruction processor, a logical error associated with the execution of an Instruction N may result in the otherwise proper completion of the Instruction N, while resulting in improper residual signal levels within the IP pipeline. These improper residual signals result in the failure of the subsequent Instruction N+1. By setting the non-fault interrupt injection bit within Translate RAM 354 for Instruction N, Instruction N is allowed to complete in the manner discussed above. Hardware sequences for Instruction N+1 are aborted by Abort Logic 198, and Microcode Controller 178 assumes control. The non-fault interrupt microcode may be modified within CS Microcode Memory 179 to cause Microcode Controller 178 to "repair" the state of the IP so that the improper residual signal levels are removed, and execution is then resumed with Instruction N+1. In this manner, the non-fault interrupt injection mechanism is utilized to repair a logical hardware error using microcode stored within the CS Microcode Memory 179. This repair is completely transparent to the operating system or any other software program executing on the IP at the time the error occurred.

The test system described above may also be used during normal machine execution to de-pipe the IP. In some instances, a logical error associated with a machine instruction causes the instruction to fail only when the IP is executing in fully pipelined mode. In these instances, the Fault Interrupt Inject Bit for the affected instruction may be set in Translate RAM 154. Execution of the instruction will cause de-piping of the IP in the manner described above, and execution will resume with that instruction, which will then execute properly. As stated above, the de-piping of the IP is transparent to the software executing on the IP.

Either the fault or non-fault interrupt injection method may be used as a general method of allowing the Microcode Controller 178 to gain temporary control of the IP pipeline, which may be useful in a variety of other situations to provide a microcode solution to a fault existing within the hardware.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. In a data processing system having a processor coupled to a memory, the processor being capable of executing machine instructions that are included within the predetermined instruction set of the data processing system, the processor including an addressing circuit to cause the processor to execute a predetermined instruction sequence retrieved from the memory, and the processor further including interrupt circuits to execute control sequences whereby execution of the processor is re-directed from the predetermined instruction sequence to execution of an interrupt handling instruction sequence upon the occurrence of predetermined interrupt events, an interrupt test system for testing interrupt sequence execution, comprising:

a storage device to store interrupt injection signals, each of said interrupt injection signals being associated with a respective one of the machine instructions;

addressing circuits coupled to said storage device to read from said storage device at least one of said interrupt injection signals associated with a respective one of the machine instructions being executed; and interrupt encode logic coupled to said storage device to receive said at least one of said interrupt injection signals and to cause the interrupt circuits to execute a selected one of the control sequences to re-direct the processor execution from said respective one of the machine instructions being executed to a selected one of the interrupt handling instruction sequences if said at least one of said interrupt injection signals is at a predetermined logic level.

2. The interrupt test system of claim 1, wherein said storage device includes circuits to store a different one of said interrupt injection signals for each of the machine instructions included within the predetermined instruction set.

3. The interrupt test system of claim 1, wherein said storage device includes circuits to store a different set of said interrupt injection signals for each of the machine instructions included within the predetermined instruction set.

4. The interrupt test system of claim 3, and further including a programmable fault interrupt blocking circuit coupled to said interrupt encode logic to enable said interrupt encode logic to selectively receive ones of said interrupt injection signals only for machine instructions occurring at a predetermined programmable interval in the predetermined instruction sequence.

5. The interrupt test system of claim 1, wherein the interrupt circuits are capable of executing ones of the control sequences which are fault control sequences, each of said fault control sequences to handle a fault occurring during execution of a respective one of the machine instructions, wherein ones of said interrupt injection signals are fault interrupt injection signals, and wherein said interrupt encode logic further includes circuits to receive, during execution of any machine instruction, a respective one of said fault interrupt injection signals, and if said respective one of said fault interrupt injection signals is at a predetermined logic level, to cause the interrupt circuits to execute a respective one of said fault control sequences for a machine instruction being executed.

6. The interrupt test system of claim 5, and further including a fault interrupt blocking circuit coupled to said interrupt encode logic to prevent said respective one of said fault interrupt injection signals from being provided to said interrupt encode logic when said respective one of the machine instructions is being executed immediately following execution of any of said fault control sequences.

7. The interrupt test system of claim 1, wherein the interrupt circuits are capable of executing ones of the control sequences which are non-fault control sequences, each of said non-fault control sequences to handle a non-fault event occurring during execution of a respective one of the machine instructions, wherein ones of said interrupt injection signals are non-fault interrupt injection signals, and wherein said interrupt encode logic further includes circuits to receive, during execution of any machine instruction, a respective one of said non-fault interrupt injection signals, and if said respective one of said non-fault interrupt injection signals is at a predetermined logic level, to cause the interrupt circuits to execute a respective one of said non-fault control sequences for a machine instruction being executed.

8. The interrupt test system of claim 1, and further including a programming interface coupled to said storage device to allow for programmable modification of said interrupt injection signals.

9. For use in a data processing system having a memory and an instruction processor coupled to the memory, the instruction processor for executing machine instructions which are part of the instruction set of the instruction processor, the instruction processor having an interrupt processing system for processing interrupt signals generated during execution of ones of the machine instructions, the interrupt processing system, comprising:

interrupt control means for receiving each of the interrupt signals, for selecting one of the interrupt signals for processing based on a predetermined priority scheme, for saving in the memory a saved processor state including signals indicative of the state of the instruction processor at a predetermined point in time, and for causing execution of the instruction processor to be re-directed from a currently-executing sequence of machine instructions to a selectable one of a plurality of interrupt sequences of machine instructions; and storage means coupled to said interrupt control means for storing interrupt injection signals, each of said interrupt injection signals being associated with a respective one of the machine instructions, whereby during execution of a machine instruction, said storage device provides to said interrupt control means interrupt injection signals associated with said machine instruction, each said provided interrupt injection signals which is set to a predetermined level is an emulated interrupt signal for emulating respective ones of said interrupt signals within said interrupt control means.

10. The interrupt processing system of claim 9, and further including programming means coupled to said storage means for selectively re-programming said storage means.

11. The interrupt processing system of claim 9, wherein said storage means includes means for storing a fault interrupt injection signal for each respective one of the machine instructions included in the instruction set, and if said fault injection signal is set to said predetermined logic level during execution of said associated one of the machine instructions, said fault injection signal for causing said interrupt control means to save in the memory those signals indicative of the state of the instruction processor just prior to the time the instruction processor began execution of said associated one of the machine instructions.

12. The interrupt system of claim 11, wherein the instruction processor is a pipelined instruction processor capable of simultaneously executing multiple ones of the machine instructions which are included in the first sequence of machine instructions, and wherein said interrupt control means further includes pipeline control means responsive to ones of said fault interrupt injection signals associated with said simultaneously executing multiple ones of the machine instructions, said pipeline control means for causing termination of execution of any one of said simultaneously executing machine instructions associated with a fault interrupt injection signal set to said predetermined logic level, and for further causing termination of execution of all of the machine instructions in the first sequence of machine instructions which follow said any one of said simultaneously executing machine instructions.

13. The interrupt processing system of claim 9, wherein said storage means includes means for storing a non-fault interrupt injection signal for each respective one of the machine instructions included in the instruction set, and if said non-fault interrupt injection signal is set to said predetermined logic level during execution of said respective one of the machine instructions, said non-fault injection signal for causing said interrupt control means to save in the memory those signals indicative of the state of the instruction processor following the time execution of said respective one of the machine instructions completes.

14. The interrupt processing system of claim 13, wherein the instruction processor is a pipelined instruction processor capable of simultaneously executing multiple ones of the machine instructions which are included in the first sequence of machine instructions, and wherein said interrupt control means further includes pipeline control means responsive to ones of said non-fault interrupt injection signals associated with said simultaneously executing multiple ones of the machine instructions, said pipeline control means for causing execution completion for any one of said simultaneously executing machine instructions associated with a non-fault interrupt injection signal set to said predetermined logic level, and for causing termination of execution of all of the machine instructions which follow said any one of said simultaneously executing machine instructions in the first sequence of machine instructions.

15. The interrupt processing system of claim 9, wherein said interrupt control means includes microcode control means for selectively preventing re-direction of instruction processor execution following reception of ones of said emulated interrupt signals.

16. The interrupt processing system of claim 9, and further including blocking means for allowing said interrupt control means to receive said emulated interrupt signals only during execution of every Nth instruction, wherein N is a positive integer.

17. The interrupt processing system of claim 16, wherein said blocking means includes programmable register means for programming said positive integer N.

18. For use in a data processing system having a memory and an instruction processor coupled to the memory, the instruction processor for executing instructions which are part of the instruction set of the data processing system, the data processing system including predetermined interrupt signals indicative of events requiring processing by the instruction processor, the instruction processor including interrupt processing logic responsive to the interrupt signals whereby the activation to a predetermined logic level of any of the interrupt signals causes the interrupt processing logic to process the activated interrupt signal by storing in memory the state of the instruction processor at a predetermined point in time, halting the execution of a first sequence of instructions, re-directing execution to a selectable second sequence of instructions selected based on the activated interrupt signal, and upon completion of the second sequence of instructions, reloading the state of the processor and resuming execution of the first sequence of instructions, a method of testing the interrupt processing logic, comprising the steps of:

(a) providing a programmable storage device storing a different respective interrupt injection indicator for predetermined ones of the instructions included within the instruction set of the data processing system;

(b) initiating execution of a first sequence of instructions which includes a selected instruction which is one of the predetermined ones of the instructions;

(c) reading from the programmable storage device the respective interrupt injection indicator for the selected instruction during execution of the selected instruction;

(d) providing the respective interrupt injection indicator for the selected instruction to the interrupt processing logic as one of the predetermined interrupt signals, and if the respective interrupt injection indicator is set to a predetermined logic level, initiating processing of the one of the predetermined interrupt signals; and (e) verifying processing of the one of the predetermined interrupt signals completed successfully.

19. The method of claim 18, wherein step (a) includes the step of re-programming the programmable storage device to set the interrupt injection indicators for each of the predetermined ones of the instructions to different logic levels.

20. The method of claim 18, whereby step (e) is performed by determining that ones of the machine instructions which follow the selected instruction within the first sequence of instructions are executed successfully.

21. The method of claim 18, wherein step (a) includes providing a programmable storage device for storing at least one respective interrupt injection indicator for each of the instructions included within the instruction set of the data processing system.

22. The method of claim 18, wherein ones of the predetermined interrupt signals are fault interrupt signals indicative of fault events occurring during execution of a respective instruction, the fault interrupt signals causing the interrupt processing logic to respond by storing in memory the state of the instruction processor at a time preceding execution by the instruction processor of the respective instruction, and wherein step (d) includes the step of providing the respective interrupt injection indicator for the selected instruction to the interrupt processing logic as one of the respective fault interrupt signals.

23. The method of claim 18, wherein ones of the predetermined interrupt signals are non-fault interrupt signals indicative of non-fault events occurring during execution of a respective instruction, the non-fault interrupt signals causing the interrupt processing logic to respond by storing in memory the state of the instruction processor at a time after execution by the instruction processor of the respective instruction, and wherein step (d) includes the step of providing the respective interrupt injection indicator for the selected instruction to the interrupt processing logic as one of the respective non-fault interrupt signals.

24. The method of claim 18, wherein step (b) includes initiating execution of a first sequence of instructions in which all of the instructions within the first sequence of instructions are predetermined ones of the instructions.

25. The method of claim 24, wherein step (d) includes the step of providing, for a currently executing instruction, the respective interrupt injection indicator at an inactive logic level irrespective of the logic level at which the interrupt injection indicator is stored within the programmable storage device if interrupt processing was performed for the instruction immediately preceding the currently executing instruction in the sequence of instruction being executed.

26. The method of claim 24, wherein step (d) includes the step of providing the respective interrupt injection indicator to the interrupt processing logic for every Nth instruction in the first instruction sequence, wherein N is a positive integer, and for all other instructions, providing the respective interrupt injection indicator to the interrupt processing logic at an inactive logic level irrespective of the logic level which is stored within the programmable storage device.

27. The method of claim 18, wherein step (d) includes the step of preventing the instruction processor from re-directing execution to a second sequence of instructions when responding to the interrupt signal.

* * * * *